(12) United States Patent
Nakamura et al.

(10) Patent No.: US 9,536,654 B2
(45) Date of Patent: Jan. 3, 2017

(54) POWER RECEIVING DEVICE, POWER TRANSMITTING DEVICE, AND POWER TRANSFER SYSTEM

(75) Inventors: Koji Nakamura, Toyota (JP); Shinji Ichikawa, Toyota (JP); Toru Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 476 days.

(21) Appl. No.: 14/346,052

(22) PCT Filed: Sep. 28, 2011

(86) PCT No.: PCT/JP2011/072227
§ 371 (c)(1),
(2), (4) Date: Mar. 20, 2014

(87) PCT Pub. No.: WO2013/046366
PCT Pub. Date: Apr. 4, 2013

(65) Prior Publication Data
US 2014/0240947 A1    Aug. 28, 2014

(51) Int. Cl.
*H01F 27/42* (2006.01)
*H01F 27/36* (2006.01)
(Continued)

(52) U.S. Cl.
CPC ............ *H01F 27/36* (2013.01); *B60L 11/182* (2013.01); *B60L 11/1824* (2013.01);
(Continued)

(58) Field of Classification Search
CPC ...................................................... H01F 27/36
(Continued)

(56) References Cited

U.S. PATENT DOCUMENTS 4,660,014 A * 4/1987 Wenaas .................. H01F 27/06
336/210
5,770,936 A * 6/1998 Hirai ....................... B23Q 1/00
307/104

(Continued)

FOREIGN PATENT DOCUMENTS

AU    2006269374 B2    1/2007
AU    2006269374 C1    1/2007
(Continued)

*Primary Examiner* — Stephen W Jackson
(74) *Attorney, Agent, or Firm* — Oliff PLC

(57) ABSTRACT

A power receiving device includes: a power receiving unit receiving electric power from an external power transmitting unit contactlessly; a first coil; a first shielding wall surrounding the first coil; a first device; a first shielding casing having the first device accommodated therein, the first shielding casing being also disposed inside the first shielding wall; and a first wiring connected to the first device and extending from inside the first shielding casing to outside the first shielding casing, and also pulled outside the first shielding wall, the first shielding casing having an external surface including a first opposite portion closer to the first shielding wall than the first coil, the first shielding wall having a first region opposite to the first opposite portion, the first region having a first hole, the first wiring being pulled outside the first shielding wall through the first hole.

24 Claims, 17 Drawing Sheets

(51) Int. Cl.
  *B60L 11/18* (2006.01)
  *H01F 38/14* (2006.01)
  *H02J 5/00* (2016.01)
  *H02J 7/02* (2016.01)

(52) U.S. Cl.
  CPC ....... *B60L 11/1829* (2013.01); *B60L 11/1833* (2013.01); *H01F 38/14* (2013.01); *H02J 5/005* (2013.01); *B60L 2210/10* (2013.01); *B60L 2210/30* (2013.01); *B60L 2210/40* (2013.01); *B60L 2270/145* (2013.01); *B60L 2270/147* (2013.01); *H02J 7/025* (2013.01); *Y02T 10/7005* (2013.01); *Y02T 10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
  USPC .......................................................... 307/104
  See application file for complete search history.

(56) References Cited

U.S. PATENT DOCUMENTS

| | | |
|---|---|---|
| 7,741,734 B2 | 6/2010 | Joannopoulos et al. |
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0254376 A1 | 10/2011 | Sasaki et al. |
| 2011/0254378 A1 | 10/2011 | Ichikawa et al. |

FOREIGN PATENT DOCUMENTS

| | | |
|---|---|---|
| AU | 2007349874 A2 | 10/2008 |
| AU | 2010200044 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-2007-252027 | 9/2007 |
| JP | A-2009-501510 | 1/2009 |
| JP | 2010-268660 A | 11/2010 |
| JP | 2011-135729 A | 7/2011 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2010/041321 A1 | 4/2010 |
| WO | 2010/106648 A1 | 9/2010 |

* cited by examiner

POWER RECEIVING DEVICE, POWER TRANSMITTING DEVICE, AND POWER TRANSFER SYSTEM

TECHNICAL FIELD

The present invention relates to a power receiving device, a power transmitting device, and a power transfer system.

BACKGROUND ART

In recent years, a hybrid vehicle, an electric vehicle and the like that uses electric power of a battery or the like to drive a driving wheel are attracting attention for environmental considerations.

In recent years, in particular, it is attracting attention to allow such a battery mounted, electrical powered vehicle as described above to have the battery charged without using a plug or the like or contactlessly, i.e., wirelessly. For example, Japanese Patent Laying-Open No. 2007-252027 describes a contactless charging system including: a battery incorporated, movable device; a power receiving unit provided in the movable device; and a contactless power transmitting device to supply the power receiving unit with electric power. The power receiving unit includes a power receiving coil, the contactless power transmitting device includes a power transmitting coil, and electric power is transmitted from the power transmitting coil to the power receiving coil through electromagnetic induction.

Furthermore, a wireless power transfer system exploiting electromagnetic resonance is described for example in WO2010/041321 describing a power transfer system. The power transfer system includes a power receiving device and a power transmitting device, and the power transmitting device includes a shield, a power transmitting coil disposed inside the shield, an electromagnetic induction coil disposed inside the shield, and a rectifier disposed inside the shield. The power receiving device includes a shield, a power receiving coil disposed inside the shield, and an electromagnetic induction coil disposed inside the shield.

CITATION LIST

Patent Documents

PTD 1: Japanese Patent Laying-Open No. 2007-252027
PTD 2: WO2010/041321

SUMMARY OF INVENTION

Technical Problem

Japanese Patent Laying-Open No. 2007-252027 describes that the power transmitting device has the power transmitting coil without any device therearound, and the power transmitting coil is thus surrounded by a large dead space. Similarly, the power receiving device also has the power receiving coil surrounded by a large dead space. The contactless charging system described in Japanese Patent Laying-Open No. 2007-252027 thus has power receiving and transmitting devices increased in size.

WO2010/041321 describes that the power receiving device has the rectifier disposed inside the shield, and the power receiving device is thus reduced in size.

However, when the rectifier has a wiring pulled out thereof and run inside the shield, and the wiring passes a current therethrough, the current is affected by an electromagnetic field formed around the power receiving coil. As a result, the rectifier provides noisy output. Note that this problem arises not only in the rectifier but also other devices. Furthermore, when the power transmitting device has a device disposed in the shield, that device's output will also be affected by an electromagnetic field formed around the power transmitting coil.

The present invention has been made in view of the issue described above, and contemplates compact power transmitting and receiving devices, and power transmitting and receiving devices providing less or no noisy output and a power transfer system.

Solution to Problem

The present invention provides a power receiving device including: a power receiving unit receiving electric power from an external power transmitting unit contactlessly; a first coil provided in the power receiving unit; a first shielding wall surrounding the first coil and defining a region in which an electromagnetic field formed around the power receiving unit is radiated; and a first device accommodated inside the first shielding wall.

The power receiving device includes: a first shielding casing having the first device accommodated therein, the first shielding casing being also disposed inside the first shielding wall; and a first wiring connected to the first device and extending from inside the first shielding casing to outside the first shielding casing, and also pulled outside the first shielding wall. The first shielding casing has an external surface including a first opposite portion closer to the first shielding wall than the first coil, and the first shielding wall has a first region opposite to the first opposite portion, the first region having a first hole. The first wiring is pulled outside the first shielding wall through the first hole.

Preferably, the first shielding casing is disposed to have the first opposite portion in contact with the first shielding wall at a portion having the first region, and the first wiring is pulled out of the first shielding casing at a portion having the first shielding casing and the first shielding wall in contact with each other.

Preferably, when the first region and the first wiring are observed inside the first shielding wall in a direction in which the first shielding casing and the first region are aligned, a portion of the first wiring located between the first shielding casing and the first hole is located in the first region.

Preferably, the first shielding casing includes a first projection introduced into the first hole, and the first wiring passes through the first projection and is pulled outside the first shielding wall.

Preferably, the first hole and the first coil have a distance therebetween larger than that between the first shielding wall and the first coil.

Preferably, the power receiving unit includes a first capacitor connected to the first coil, and the first hole and the first capacitor have a distance therebetween larger than that between the first capacitor and the first shielding wall.

Preferably, the power receiving device further includes a first electromagnetic induction coil receiving electric power from the first coil through electromagnetic induction. The first device is a rectifier body connected to the first electromagnetic induction coil. The first wiring passes a current rectified by the rectifier body.

Preferably, the first shielding wall includes a top disposed under a floor panel of a vehicle, and a surrounding side wall hanging downward from the top, and the first hole is formed through the top.

Preferably, the power transmitting unit and the power receiving unit have natural frequencies, respectively, with a difference equal to or smaller than 10% of the natural frequency of the power receiving unit.

Preferably, the power receiving unit and the power transmitting unit have a coupling coefficient equal to or smaller than 0.1. Preferably, the power receiving unit receives electric power from the power transmitting unit through at least one of a magnetic field formed between the power receiving unit and the power transmitting unit and oscillating at a particular frequency and an electric field formed between the power receiving unit and the power transmitting unit and oscillating at a particular frequency.

The present invention provides a power transmitting device including: a power transmitting unit transmitting electric power to an external power receiving unit contactlessly; a second shielding wall surrounding the power transmitting device and defining a region in which an electromagnetic field formed around the power transmitting device is radiated; and a second device accommodated inside the second shielding wall. The power transmitting device includes: a second shielding casing having the second device accommodated therein, the second shielding casing being also disposed inside the second shielding wall; and a second wiring connected to the second device and extending from inside the second shielding casing to outside the second shielding casing, and also pulled outside the second shielding wall. The second shielding casing has an external surface including a second opposite portion closer to the second shielding wall than the second coil. The second shielding wall has a second region opposite to the second opposite portion, the second region having a second hole. The second wiring is pulled outside the second shielding wall through the second hole.

Preferably, the second shielding casing is disposed to have the second opposite portion in contact with the second shielding wall at a portion having the second region, and the second wiring is pulled out of the second shielding casing at a portion of the second shielding casing in contact with the second region.

Preferably, when the second region and the second wiring are observed inside the second shielding wall in a direction in which the second shielding casing and the second region are aligned, a portion of the second wiring located between the second shielding casing and the second hole is located in the second region.

Preferably, the second shielding casing includes a second projection introduced into the second hole, and the second wiring passes through the second projection and is pulled outside the second shielding wall.

Preferably, the second hole and the second coil have a distance therebetween larger than that between the second shielding wall and the second coil.

Preferably, the power transmitting unit includes a second capacitor connected to the second coil, and the second hole and the second capacitor have a distance therebetween larger than that between the second capacitor and the second shielding wall.

Preferably, the power transmitting device further includes a second electromagnetic induction coil passing electric power to the second coil through electromagnetic induction. The second device is an impedance adjuster connected to the second electromagnetic induction coil. The second device is an impedance adjuster body adjusting a resonance unit associated with facilities and the second electromagnetic induction coil in impedance or resonant frequency.

Preferably, the second shielding wall includes a bottom wall and a surrounding side wall rising upward from the bottom wall, and the second hole is formed through the bottom wall.

Preferably, the power transmitting unit and the power receiving unit have natural frequencies, respectively, with a difference equal to or smaller than 10% of the natural frequency of the power receiving unit. Preferably, the power receiving unit and the power transmitting unit have a coupling coefficient equal to or smaller than 0.1.

Preferably, the power transmitting unit transmits electric power to the power receiving unit through at least one of a magnetic field formed between the power transmitting unit and the power receiving unit and oscillating at a particular frequency and an electric field formed between the power transmitting unit and the power receiving unit and oscillating at a particular frequency.

The present invention provides a power transfer system including a power receiving device and a power transmitting device including a power transmitting unit. The power receiving device has: a power receiving unit receiving electric power from the power transmitting unit contactlessly; a first coil provided in the power receiving unit; a first shielding wall surrounding the first coil and defining a region in which an electromagnetic field formed around the first coil is radiated; a first device accommodated inside the first shielding wall; a first shielding casing having the first device accommodated therein, the first shielding casing being also disposed inside the first shielding wall; and a first wiring connected to the first device and extending from inside the first shielding casing to outside the first shielding casing, and also pulled outside the first shielding wall. The first shielding casing has an external surface including a first opposite portion closer to the first shielding wall than the first coil. The first shielding wall has a first region opposite to the first opposite portion, the first region having a first hole. The first wiring is pulled outside the first shielding wall through the first hole.

The present invention provides the power transfer system to include in another aspect a power transmitting device and a power receiving device including a power receiving unit. The power transmitting device has: a power transmitting unit transmitting electric power to the power receiving unit contactlessly; a second coil provided in the power transmitting unit; a second shielding wall surrounding the second coil and defining a region in which an electromagnetic field formed around the second coil is radiated; a second device accommodated inside the second shielding wall; a second shielding casing having the second device accommodated therein, the second shielding casing being also disposed inside the second shielding wall; and a second wiring connected to the second device and extending from inside the second shielding casing to outside the second shielding casing, and also pulled outside the second shielding wall. The second shielding casing has an external surface including a second opposite portion closer to the second shielding wall than the second coil. The second shielding wall has a second region opposite to the second opposite portion, the second region having a second hole. The second wiring is pulled outside the second shielding wall through the second hole.

Advantageous Effects of Invention

The present power receiving and transmitting devices and power transfer system can thus reduce/prevent disturbance introduced into a wiring that is connected to a device disposed in the power receiving or transmitting device and is externally pulled out.

BRIEF DESCRIPTION OF DRAWINGS

FIG. 24 is a plan view schematically showing a wiring, a hole, an adjacent region, and the like.

FIG. 26 is a perspective view of an impedance adjuster, a wiring, a resin casing, and the like.

DESCRIPTION OF EMBODIMENTS

Note that, in the embodiments described below, when numbers, amounts and the like are referred to, the present invention is not necessarily limited thereto unless otherwise specified. Furthermore, in the following embodiments, each component is not essential to the present invention unless otherwise specified. Furthermore, when a plurality of embodiments, exemplary variations and/or the like are provided below, it is initially intended to combine their features, as appropriate, unless otherwise specified. With reference to FIGS. 1 to 29, the present invention in embodiments provides a power receiving device, a power transmitting device, and a power transfer system including the power transmitting and receiving devices, as will be described hereinafter.

First Embodiment

Figure 1:
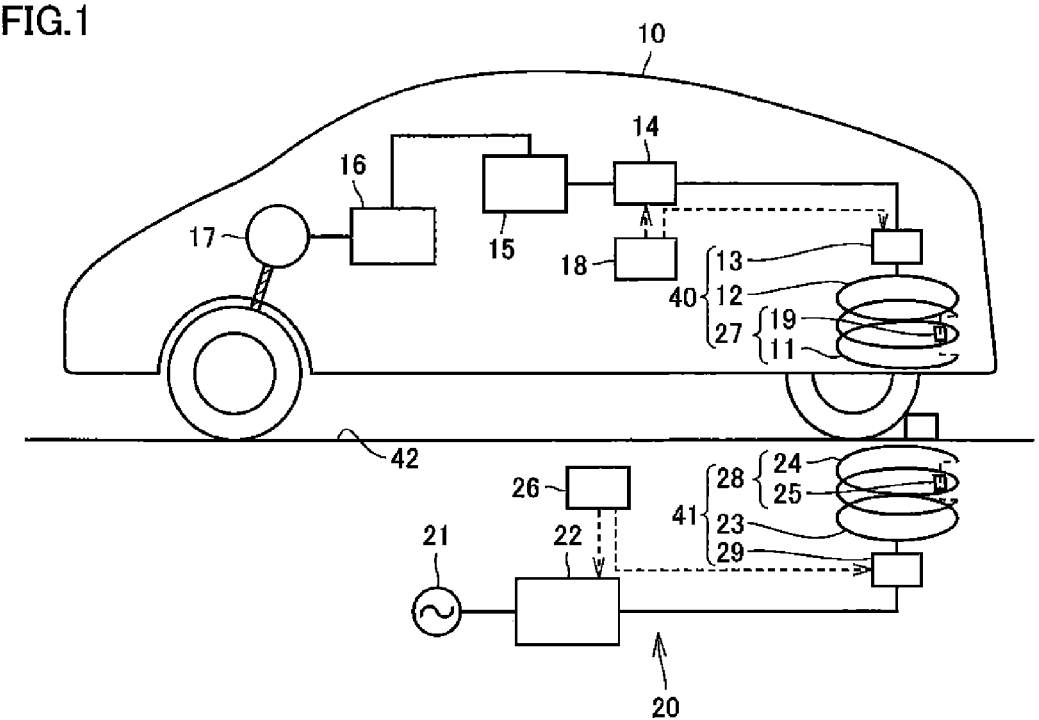
FIG. 1 schematically shows a power receiving device, a power transmitting device and a power transfer system according to a first embodiment.

FIG. 1 is a schematically shows a power receiving device, a power transmitting device and a power transfer system according to a first embodiment. The power transfer system according to the first embodiment has an electrical powered vehicle 10 including a power receiving device 40, and an external power feeding apparatus 20 including a power transmitting device 41. When electrical powered vehicle 10 is parked at a prescribed position in a parking space 42 provided with power transmitting device 41, electrical powered vehicle 10 receives electric power via power receiving device 40 mainly from power transmitting device 41.

Parking space 42 is provided with a wheel block, a line and/or the like to allow electrical powered vehicle 10 to be stopped at the prescribed position.

External power feeding apparatus 20 includes a high-frequency power driver 22 connected to an alternating current power supply 21, a control unit 26 to control driving high-frequency power driver 22 and the like, and power transmitting device 41 connected to high-frequency power driver 22. Power transmitting device 41 includes a power transmitting unit 28, an electromagnetic induction coil 23, and an impedance adjuster 29 connected to electromagnetic induction coil 23. Power transmitting unit 28 includes a resonant coil 24 and a capacitor 25 connected to resonant coil 24. Impedance adjuster 29 is electrically connected to high-frequency power driver 22. While FIG. 1 shows an example provided with capacitor 25, capacitor 25 is not essential. Note that while in the present embodiment resonant coil 24 receives electric power via a member implemented as electromagnetic induction coil 23, electromagnetic induction coil 23 is not essential.

Power transmitting unit 28 includes an electric circuit formed of an inductance L of resonant coil 24, and a stray capacitance of resonant coil 24 and a capacitance of capacitor 25.

Electrical powered vehicle 10 includes power receiving device 40, a DC/DC converter 14 connected to power receiving device 40, a battery 15 connected to DC/DC converter 14, a power control unit (PCU) 16, a motor unit 17 connected to power control unit 16, and a vehicular electronic control unit (vehicular ECU) 18 to control driving DC/DC converter 14, power control unit 16, and the like. Note that while the present embodiment provides electrical powered vehicle 10 that is a hybrid vehicle equipped with an engine (not shown), electrical powered vehicle 10 also includes an electric vehicle, a fuel cell vehicle and the like as long as it is driven by a motor.

Power receiving device 40 includes a power receiving unit 27, an electromagnetic induction coil 12, and a rectifier 13. Power receiving unit 27 includes a resonant coil 11 and a capacitor 19. Resonant coil 11 has a stray capacitance. Accordingly, power receiving unit 27 has an electric circuit formed of an inductance of resonant coil 11 and a capacitance of resonant coil 11 and capacitor 19. Note that capacitor 19 is not essential and may be dispensed with.

Rectifier 13 is connected to electromagnetic induction coil 12, and rectifier 13 receives an alternating current from electromagnetic induction coil 12, converts the received alternating current into a direct current and supplies the direct current to DC/DC converter 14.

DC/DC converter 14 receives the direct current from rectifier 13, adjusts the received direct current in voltage, and supplies it to battery 15. Note that DC/DC converter 14 is not essential and may be dispensed with.

Power control unit 16 includes a converter connected to battery 15 and an inverter connected to the converter, and the converter adjusts (or boosts) the direct current supplied from battery 15 and supplies the adjusted direct current to the inverter. The inverter receives the direct current from the converter, converts the direct current into an alternating current, and supplies the alternating current to motor unit 17.

Motor unit 17 is for example a three-phase alternating current motor or the like, and motor unit 17 is driven by the alternating current supplied from the inverter of power control unit 16.

When electrical powered vehicle 10 is a hybrid vehicle, electrical powered vehicle 10 further includes an engine and a power split device, and motor unit 17 includes a motor generator that functions mainly as a power generator, and a motor generator that functions mainly as a motor.

The power transfer system according to the present embodiment has power transmitting unit 28 and power receiving unit 27 having natural frequencies, respectively, with a difference equal to or smaller than 10% of the natural frequency of power receiving unit 27 or power transmitting unit 28. Power transmitting unit 28 and power receiving unit 27 having their respective natural frequencies set in such a range allow more efficient power transfer. In contrast, power transmitting unit 28 and power receiving unit 27 having their respective natural frequencies with a difference larger than 10% of that of power receiving unit 27 or power transmitting unit 28 result in power transfer efficiency smaller than 10% and hence a detriment such as a longer period of time required to charge battery 15.

Herein, when capacitor 25 is not provided, the natural frequency of power transmitting unit 28 means an oscillation frequency at which an electric circuit formed of an inductance of resonant coil 24 and a capacitance of resonant coil 24 provides free oscillation. When capacitor 25 is provided, the natural frequency of power transmitting unit 28 means an oscillation frequency at which an electric circuit formed of a capacitance of resonant coil 24 and capacitor 25 and an inductance of resonant coil 24 provides free oscillation. In the above electric circuit when braking force and electric resistance are zeroed or substantially zeroed the obtained natural frequency is also referred to as a resonance frequency of power transmitting unit 28.

Similarly, when capacitor 19 is not provided, the natural frequency of power receiving unit 27 means an oscillation frequency at which an electric circuit formed of an inductance of resonant coil 11 and a capacitance of resonant coil 11 provides free oscillation. When capacitor 19 is provided, the natural frequency of power receiving unit 27 means an oscillation frequency at which an electric circuit formed of a capacitance of resonant coil 11 and capacitor 19 and an inductance of resonant coil 11 provides free oscillation. In the above electric circuit when braking force and electric resistance are zeroed or substantially zeroed the obtained natural frequency is also referred to as a resonance frequency of power receiving unit 27.

Figure 2:
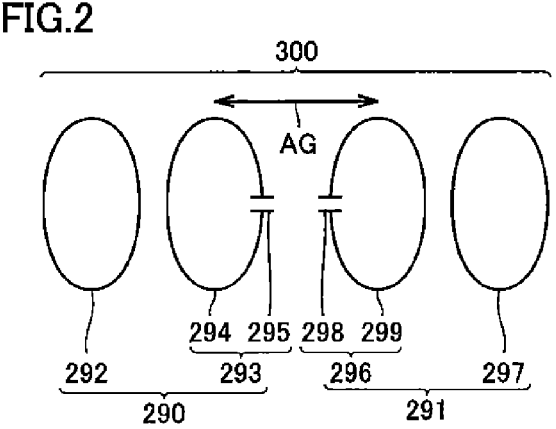
FIG. 2 shows a model to simulate the power transfer system.
Figure 3:
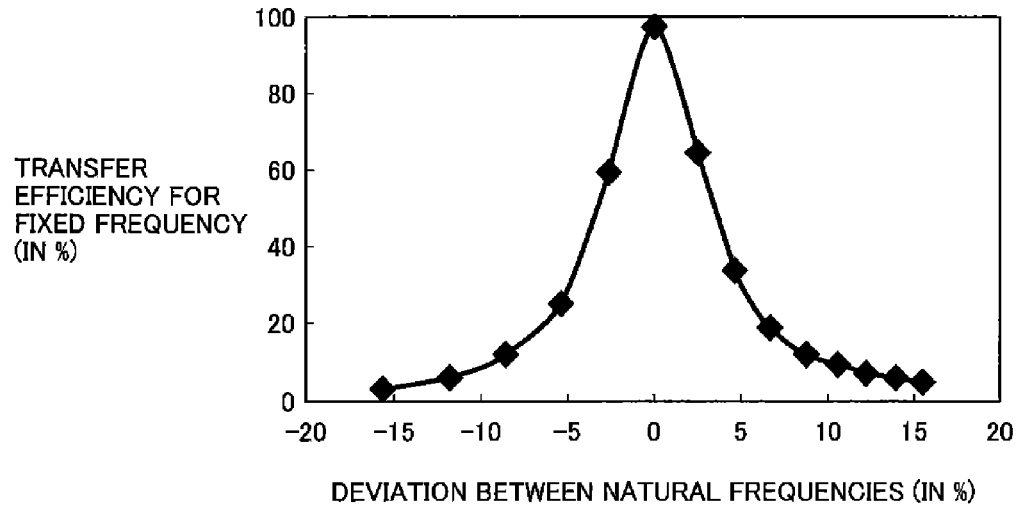
FIG. 3 is a graph representing a result of the simulation.

Reference will now be made to FIG. 2 and FIG. 3 to describe a simulation result of having analyzed a relationship between a difference between natural frequencies and power transfer efficiency. FIG. 2 shows a model to simulate the power transfer system. A power transfer system 300 includes a power transmitting device 290 and a power receiving device 291, and power transmitting device 290 includes an electromagnetic induction coil 292 and a power transmitting unit 293. Power transmitting unit 293 includes a resonant coil 294 and a capacitor 295 provided in resonant coil 294.

Power receiving device 291 includes a power receiving unit 296 and an electromagnetic induction coil 297. Power receiving unit 296 includes a resonant coil 299 and a capacitor 298 connected to resonant coil 299.

Resonant coil 294 has inductance Lt and capacitor 295 has capacitance C1 for the sake of illustration. Resonant coil 299 has inductance Lr and capacitor 298 has capacitance C2 for the sake of illustration. When each parameter is thus set, power transmitting unit 293 and power receiving unit 296 have natural frequency f1 and natural frequency f2, respectively, expressed by the following expressions (1) and (2), respectively:

$$f1 = 1/\{2\pi(Lt \times C1)^{1/2}\} \quad (1),$$

$$f2 = 1/\{2\pi(Lr \times C2)^{1/2}\} \quad (2).$$

When inductance Lr and capacitances C1 and C2 are fixed and inductance Lt is alone varied, FIG. 3 shows a relationship between a deviation between the natural frequencies respectively of power transmitting and receiving units 293 and 296 and power transfer efficiency. Note that in this simulation, resonant coil 294 and resonant coil 299 have their relative positional relationship fixed, and furthermore, power transmitting unit 293 is supplied with a current fixed in frequency.

The FIG. 3 graph has an axis of abscissa representing the natural frequencies' deviation (in %) and an axis of ordinate representing transfer efficiency (in %) for a fixed frequency. The natural frequencies' deviation (in %) is expressed by the following expression (3):

$$\text{natural frequencies' deviation} = \{(f1-f2)/f2\} \times 100 (\text{in } \%) \quad (3).$$

As is also apparent from FIG. 3, when the natural frequencies have a deviation (in %) of ±0%, power transfer efficiency close to 100% is attained. When the natural frequencies have a deviation (in %) of ±5%, power transfer efficiency of 40% is provided. When the natural frequencies have a deviation (in %) of ±10%, power transfer efficiency of 10% is provided. When the natural frequencies have a deviation (in %) of ±15%, power transfer efficiency of 5% is provided. In other words, it can be seen that the power transmitting and receiving units having their respective natural frequencies set with a deviation (in %) in absolute value (or a difference) falling within a range of 10% or smaller of the natural frequency of power receiving unit 296, allow efficient power transfer. Furthermore, it can be seen that the power transmitting and receiving units having their respective natural frequencies set with a deviation (in %) in absolute value equal to or smaller than 5% of the natural frequency of power receiving unit 296, allow more efficient power transfer. The simulation has been done with an electromagnetic field analysis software (JMAG®) produced by JSOL Corporation.

How the power transfer system according to the present embodiment operates will be described hereinafter.

In FIG. 1, electromagnetic induction coil 23 receives alternating current power from high-frequency power driver 22. When electromagnetic induction coil 23 passes a prescribed alternating current therethrough, electromagnetic induction arises and thus allows resonant coil 24 to also pass an alternating current therethrough. In doing so, electromagnetic induction coil 23 is supplied with electric power to allow resonant coil 24 to pass an alternating current having a particular frequency.

When resonant coil 24 passes an alternating current having the particular frequency, an electromagnetic field oscillating at a particular frequency is formed surrounding resonant coil 24.

Resonant coil 11 is disposed within a prescribed range as measured from resonant coil 24, and resonant coil 11 receives electric power from the electromagnetic field surrounding resonant coil 24.

In the present embodiment, resonant coil 11 and resonant coil 24 are each a so-called helical coil. Accordingly, resonant coil 24 is surrounded mainly by a magnetic field oscillating at a particular frequency, and resonant coil 11 receives electric power from that magnetic field.

Hereinafter will be described the magnetic field of the particular frequency surrounding resonant coil 24. The magnetic field of the particular frequency has a relation typically with power transfer efficiency and a frequency of a current supplied to resonant coil 24. Accordingly, initially will be described a relationship between power transfer efficiency and the frequency of the current supplied to resonant coil 24. Efficiency in transferring electric power from resonant coil 24 to resonant coil 11 varies with various factors, such as a distance between resonant coil 24 and resonant coil 11. For example, power transmitting unit 28 and power receiving unit 27 have a natural frequency (or resonance frequency) f0, resonant coil 24 receives a current having a frequency f3, and resonant coils 11 and 24 have an air gap AG therebetween, for the sake of illustration.

Figure 4:
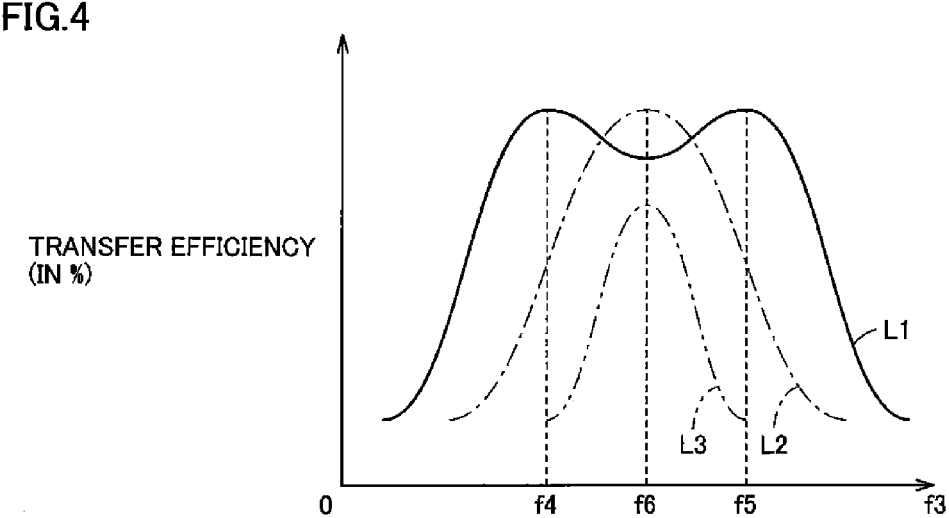
FIG. 4 is a graph of power transfer efficiency for a fixed natural frequency and a varying air gap versus frequency f of a current supplied to a resonant coil.

FIG. 4 is a graph of power transfer efficiency with natural frequency f0 fixed and air gap AG varied versus frequency f3 of the current supplied to resonant coil 24.

FIG. 4 shows the graph with an axis of abscissa representing frequency f3 of the current supplied to resonant coil 24 and an axis of ordinate representing power transfer efficiency (in %). An efficiency curve L1 schematically represents a relationship between power transfer efficiency provided when air gap AG is small and frequency f3 of the current supplied to resonant coil 24. As indicated by efficiency curve L1, when air gap AG is small, power transfer efficiency peaks at frequencies f4 and f5, wherein f4<f5. As air gap AG becomes larger, increasing power transfer efficiency has two peaks approaching each other. Then, as indicated by an efficiency curve L2, when air gap AG is larger than a prescribed distance, power transfer efficiency has a single peak, and when resonant coil 24 receives a current having a frequency f6, power transfer efficiency peaks. When air gap AG is still larger than that corresponding to efficiency curve L2, then, as indicated by an efficiency curve L3, power transfer efficiency peaks lower.

For example, more efficient power transfer may be achieved by a first methodology, as follows: In accordance with air gap AG resonant coil 24 shown in FIG. 1 may be supplied with a current fixed in frequency and capacitors 25, 19 and the like may be varied in capacitance to change characteristics of power transfer efficiency between power transmitting unit 28 and power receiving unit 27. More specifically, while resonant coil 24 is supplied with a current fixed in frequency, capacitors 25 and 19 are adjusted in capacitance to allow power transfer efficiency to peak. In this methodology, resonant coil 24 and resonant coil 11 pass a current fixed in frequency, regardless of the size of air gap AG. Power transfer efficiency characteristics may alternatively be changed by utilizing a matching device provided between power transmitting device 41 and high-frequency power driver 22 or by utilizing converter 14, or the like.

A second methodology is based on the size of air gap AG to adjust in frequency a current supplied to resonant coil 24. For example, in FIG. 4, for a power transfer characteristic corresponding to efficiency curve L1, resonant coil 24 is supplied with a current of frequency f4 or f5. For power transfer characteristics corresponding to efficiency curves L2 and L3, resonant coil 24 is supplied with a current of frequency f6. Thus a current that passes through resonant coil 24 and resonant coil 11 will be varied in frequency in accordance with the size of air gap AG.

In the first methodology, resonant coil 24 will pass a current fixed in frequency, whereas in the second methodology, resonant coil 24 will pass a current varying in frequency, as appropriate, with air gap AG. The first or second methodology or the like is thus employed to supply resonant coil 24 with a current of a particular frequency set to provide efficient power transfer. As resonant coil 24 passes a current of the particular frequency therethrough, a magnetic field (an electromagnetic field) oscillating at a particular frequency is formed surrounding resonant coil 24. Power receiving unit 27 receives electric power from power transmitting unit 28 through a magnetic field formed between power receiving unit 27 and power transmitting unit 28 and oscillating at a particular frequency. Accordingly, "a magnetic field oscillating at a particular frequency" is not limited to a magnetic field of a fixed frequency. Note that while in the above example air gap AG is focused on and accordingly a current that is supplied to resonant coil 24 is set in frequency, power transfer efficiency also varies with other factors such as horizontal misalignment of resonant coils 24 and 11, and the current supplied to resonant coil 24 may be adjusted in frequency based on such other factors.

The present embodiment has been described for an example with a resonant coil implemented as a helical coil. If the resonant coil is an antenna such as a meander line antenna, resonant coil 24, passing a current of a particular frequency therethrough, is surrounded by an electric field of a particular frequency. Through this electric field, power transmitting unit 28 and power receiving unit 27 transfer electric power therebetween.

Figure 5:
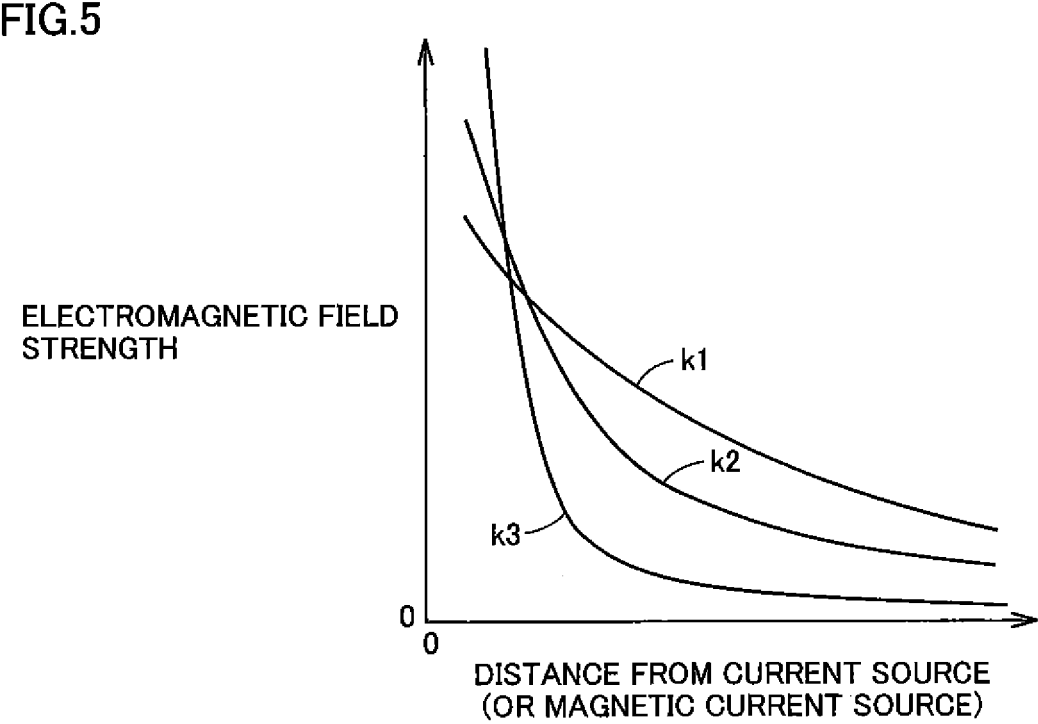
FIG. 5 is a graph of electromagnetic field strength versus a distance from a current source (or a magnetic current source).

The power transfer system according to the present embodiment exploits a near field that is dominated by an "electrostatic field" of an electromagnetic field (i.e., an evanescent field) to transmit and receive electric power more efficiently. FIG. 5 is a graph illustrating a relationship between a distance from a current source (or a magnetic current source) and electromagnetic field strength. With reference to FIG. 5, an electromagnetic field is formed of three components. A curve k1 represents a component in inverse proportion to a distance from a wave source, referred to as "radiation electric field." A curve k2 represents a component in inverse proportion to the square of the distance from the wave source, referred to as "induction electric field." A curve k3 represents a component in inverse proportion to the cube of the distance from the wave source, referred to as "electrostatic field." When the electromagnetic field has a wavelength λ, a distance allowing the "radiation electric field," the "induction electric field," and the "electrostatic field" to be substantially equal in strength can be represented as $\lambda/2\pi$.

An "electrostatic field" is a region where an electromagnetic wave sharply drops in strength as a function of the distance from the wave source, and the power transfer system according to the present embodiment leverages a near field dominated by the electrostatic field (i.e., an evanescent field) to transfer energy (or electric power). More specifically, power transmitting unit 28 and power receiving unit 27 having close natural frequencies (e.g., a pair of LC resonant coils) are resonated in a near field dominated by an "electrostatic field" to transfer energy (or electric power) from power transmitting unit 28 to power receiving unit 27. The "electrostatic field" does not propagate energy over a long distance, and resonance methodology can transfer electric power with less energy loss than an electromagnetic wave, which transfers energy (or electric power) via the "radiation electric field" propagating energy over a long distance.

Thus the power transfer system according to the present embodiment allows power transmitting unit 28 and power receiving unit 27 to resonate through an electromagnetic field to transfer electric power from power transmitting device 41 to the power receiving device. Power transmitting unit 28 and power receiving unit 27 have a coupling coefficient (κ) equal to or smaller than 0.1. Note that when electromagnetic induction is exploited to transfer electric power, a power transmitting unit and a power receiving unit typically have a coupling coefficient (κ) close to 1.0.

Coupling of power transmitting unit 28 and power receiving unit 27 in power transfer in the present embodiment is referred to for example as "magnetic resonant coupling," "magnetic field resonant coupling," "electromagnetic field resonant coupling," or "electric field resonant coupling."

"Electromagnetic field resonant coupling" means coupling including all of "magnetic resonant coupling," "magnetic field resonant coupling" and "electric field resonant coupling."

Resonant coil 24 of power transmitting unit 28 and resonant coil 11 of power receiving unit 27 as described in the present specification are coil antennas, and accordingly, power transmitting unit 28 and power receiving unit 27 are coupled mainly by a magnetic field and power transmitting unit 28 and power receiving unit 27 are coupled by "magnetic resonant coupling" or "magnetic field resonant coupling."

Note that resonant coils 24 and 11 may for example be meander line antennas, and in that case, power transmitting unit 28 and power receiving unit 27 are coupled mainly via an electric field. In that case, power transmitting unit 28 and power receiving unit 27 are coupled by "electric field resonant coupling."

Figure 6:
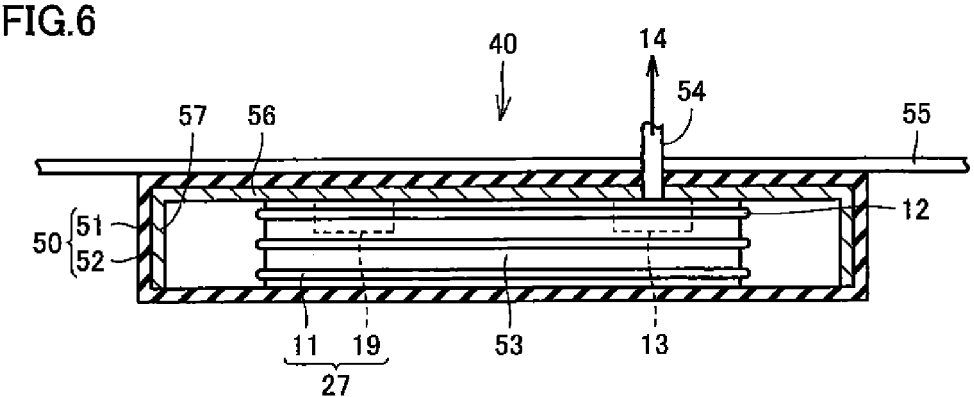
FIG. 6 is a lateral cross section of the power receiving device according to the present embodiment.
Figure 7:
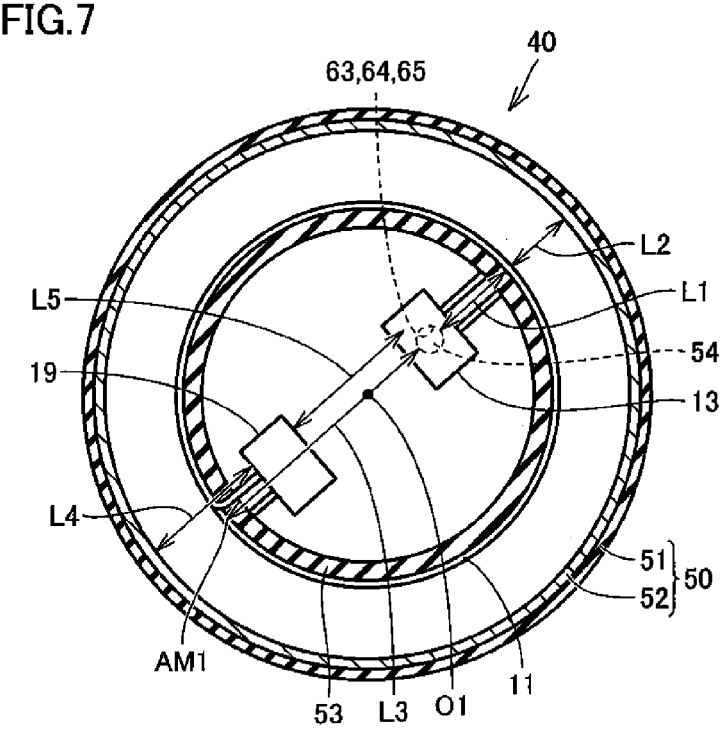
FIG. 7 is a cross section of the power receiving device.

FIG. 6 is a lateral cross section of power receiving device 40 according to the present embodiment, and FIG. 7 is a cross section of power receiving device 40.

As shown in FIG. 6 and FIG. 7, power receiving device 40 includes power receiving unit 27, electromagnetic induction coil 12, a coil supporting member 53, and a casing 50. Casing 50 accommodates power receiving unit 27, electromagnetic induction coil 12, and coil supporting member 53 therein.

Casing 50 includes a hollow, cylindrical resin casing 51, and a shielding wall 52 provided on an internal, circumferential surface of resin casing 51. Casing 50 is disposed on a lower surface of a floor panel 55 of the vehicle.

Shielding wall 52 includes a top 56 located adjacent the lower side of floor panel 55, and a surrounding side wall 57 hanging downward from a circumference of top 56. Shielding wall 52 is opened downward.

Shield walling 52 is formed of metallic material such as copper and restricts a region in which an electromagnetic field formed around resonant coil 11 in transferring electric power is radiated.

For example, shielding wall 52 has top 56 to reduce or prevent an electromagnetic wave that is radiated from resonant coil 11 in transferring electric power entering the vehicle, and shielding wall 52 has surrounding side wall 57 to reduce or prevent an electromagnetic wave leaking around the vehicle from a gap between the vehicle and the ground surface. As shielding wall 52 has a lower side with an opening, an electromagnetic wave formed around resonant coil 11 is mainly radiated downward through that opening.

Coil supporting member 53 is formed cylindrically and coil supporting member 53 is formed of resin material. The power receiving unit 27 resonant coil 11 and electromagnetic induction coil 12 are attached on an outer circumferential surface of coil supporting member 53. Note that coil supporting member 53 is not limited to such a member as a cylindrical bobbin, and a columnar support may instead be disposed annularly to form coil supporting member 53. This example also has resonant coil 11 and electromagnetic induction coil 12 attached on an outer circumference of the annularly disposed columnar support.

Capacitor 19 is disposed inside coil supporting member 53, and capacitor 19 is connected to resonant coil 11 at opposite ends.

Rectifier 13 is disposed inside coil supporting member 53, and rectifier 13 is connected to electromagnetic induction coil 12 at opposite ends.

Rectifier 13 has a wiring 54 connected thereto, and wiring 54 is connected to converter 14 mounted in the vehicle.

Rectifier 13 is disposed on shielding wall 52 at top 56, and wiring 54 is pulled out through a hole formed through top 56 and wiring 54 is thus introduced into the vehicle. Wiring 54 passes a current rectified by rectifier 13.

Figure 8:
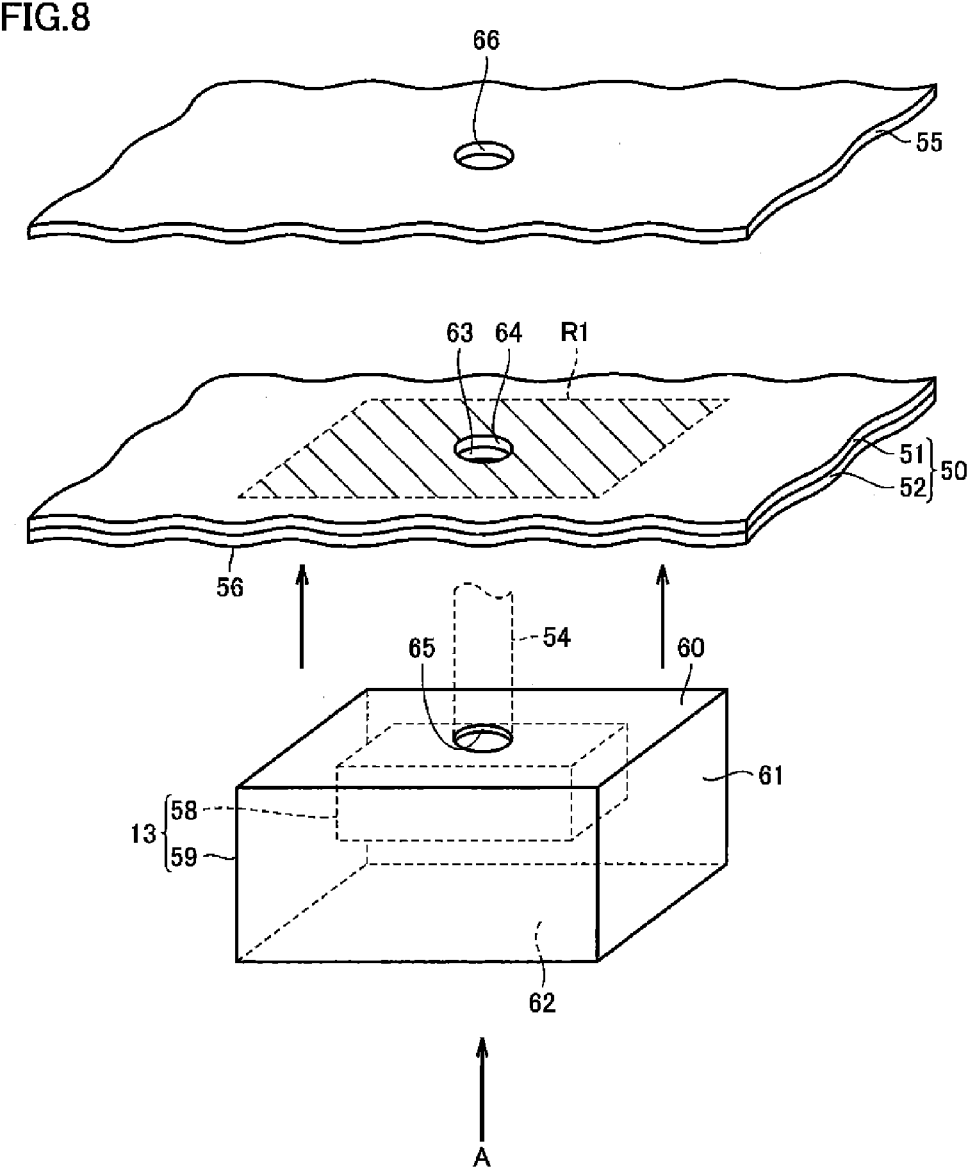
FIG. 8 is an exploded perspective view of a rectifier and a region allowing the rectifier to be disposed on a top.

FIG. 8 is an exploded perspective view of region R1 allowing rectifier 13 to be disposed on top 56. Note that in FIG. 8 wiring 54 is indicated by a broken line.

Rectifier 13 includes a rectifier body 58, and a shielding casing 59 to accommodate rectifier body 58 therein. Shielding casing 59 includes a top 60, a surrounding side wall 61 hanging downward from an outer peripheral edge of top 60, and a bottom 62 provided at a lower end of surrounding side wall 61. Top 60 is close to top 56 than resonant coil 11 shown in FIG. 6 or the like.

Top 60 has a hole 65 allowing wiring 54 connected to rectifier body 58 to be pulled out of shielding casing 59. Shielding casing 59 is formed of metallic material such as copper and reduces or prevents an electromagnetic wave entering shielding casing 59.

Figure 9:
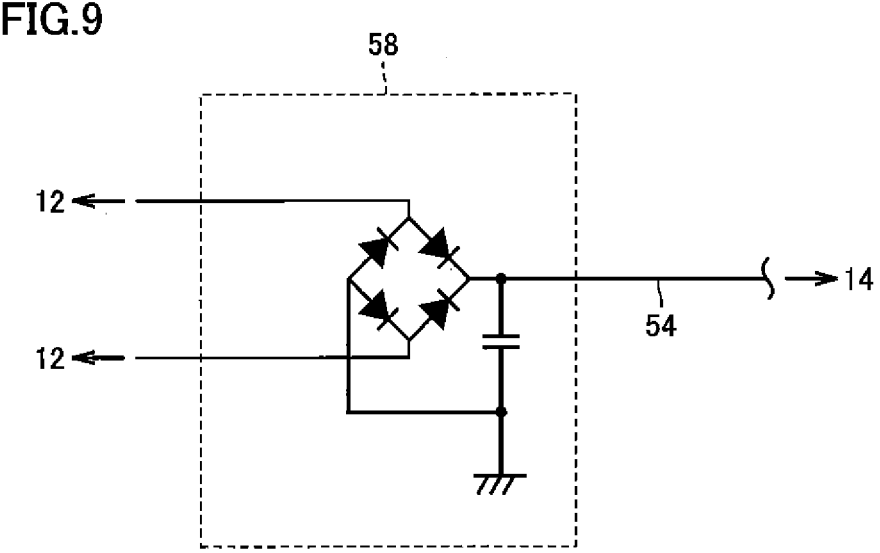
FIG. 9 is a circuit diagram schematically showing a device.

FIG. 9 is a circuit diagram schematically showing rectifier body 58. As shown in FIG. 9, rectifier body 58 includes an electric circuit including a plurality of elements and a capacitor. In FIG. 8, shielding casing 59 has rectifier body 58 that is shown in FIG. 9 accommodated therein to prevent rectifier body 58 from having its elements erroneously operated by an external electromagnetic wave.

Herein, in FIG. 8, shielding wall 52 has top 56 including region R1 allowing shielding casing 59 to be disposed thereon at top 60. Note that in the first embodiment shielding casing 59 is disposed such that shielding casing 59 has top 60 in contact with top 56 at a portion having region R1.

Of top 60, a portion at which region R1 is located is provided with a hole 63 receiving and allowing wiring 54 to pass therethrough, and resin casing 51 also has a top provided with a hole 64 in communication with hole 63. Wiring 54 pulled out of shielding casing 59 passes through hole 63 and hole 65 and is pulled out of casing 50. Note that floor panel 55 also has a hole 66 and wiring 54 passes through hole 66 and is pulled out into the vehicle.

Figure 10:
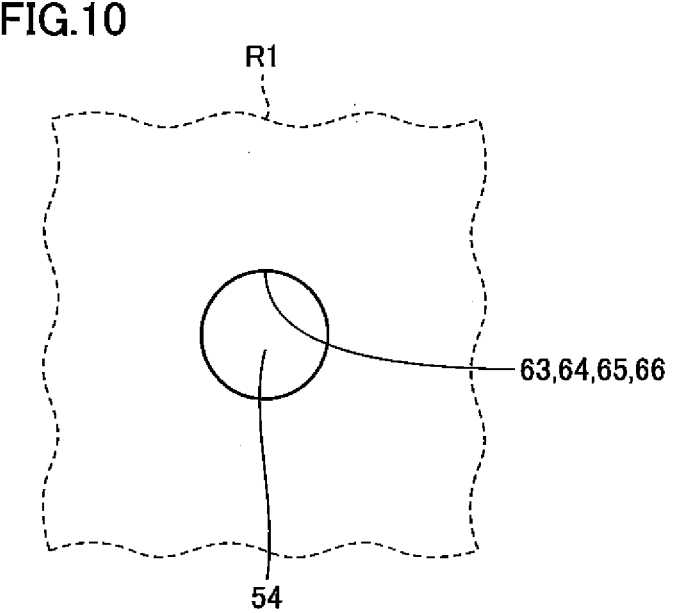
FIG. 10 is a plan view obtained when a wiring and a region R1 are observed inside a casing in a direction indicated in FIG. 8 by an arrow A.

FIG. 10 is a plan view obtained when wiring 54 and region R1 are observed inside casing 50 in a direction indicated in FIG. 8 by an arrow A. Arrow A indicates a direction in which top 60 of shielding casing 59 and region R1 are aligned. As indicated in FIG. 10, a portion of wiring 54 located between shielding casing 59 and hole 63 is located in region R1. Region R1 is a region allowing shielding wall 52 and shielding casing 59 to have their respective tops 56 and 60 in contact with each other, and an electromagnetic wave radiated from resonant coil 11 is not allowed to easily enter between region R1 and top 60.

Thus, wiring 54 is less easily disturbed. Note that a portion of wiring 54 located in shielding casing 59 is protected by shielding casing 59 and a portion of wiring 54 located outside casing 50 is protected by shielding wall 52.

Furthermore, holes 63, 64, 65, 66 are aligned in the direction of arrow A and positioned in communication with each other. This allows wiring 54 to be pulled out of casing 50 without passing through a space located outside shielding casing 59 and inside casing 50, and thus reduces or prevents an electromagnetic wave that is radiated from resonant coil 11 entering wiring 54.

Furthermore, holes 63, 64, 65, 66 aligned in a single direction in communication with each other prevent wiring 54 from bending.

Figure 11:
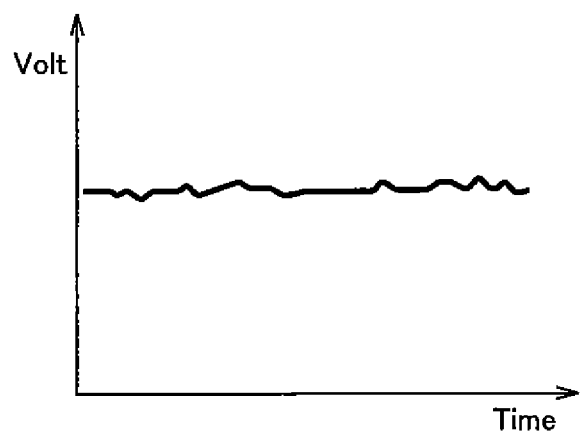
FIG. 11 is a graph representing a current passing through a wiring pulled out of a shielding casing through a lateral side and then pulled out of a casing externally through a wall.
Figure 12:
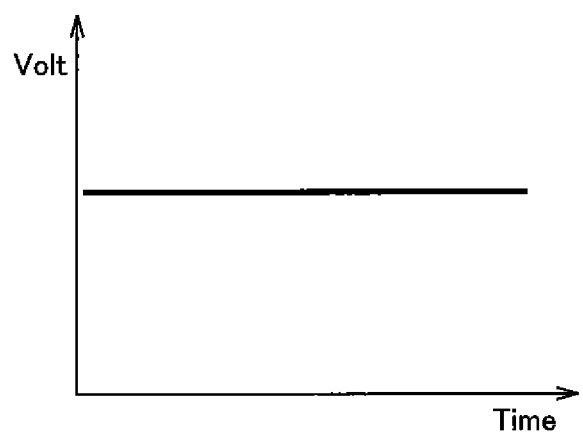
FIG. 12 is a graph representing a current passing through a wiring in the power receiving device according to the present embodiment.

FIG. 11 is a graph representing a current passing through wiring 54 pulled out of shielding casing 59 through a lateral side and then pulled out of casing 50 externally through a wall. FIG. 12 is a graph representing a current passing through wiring 54 in power receiving device 40 according to the present embodiment.

FIGS. 11 and 12 show the graphs each with an axis of abscissa representing time and an axis of ordinate representing a current passing through wiring 54 in amount. As is also apparent from FIGS. 11 and 12, when wiring 54 passes through a space located outside shielding casing 59 and inside casing 50, wiring 54 passes a current varying in amount. In contrast, power receiving device 40 according to the present embodiment allows wiring 54 to pass a current of a fixed amount.

In FIG. 7, holes 63, 64, 65 and resonant coil 11 have a distance L1 therebetween and resonant coil 11 and shielding wall 52 have a distance L2 therebetween, and distance L1 is larger than distance L2.

If resonant coil 11 is adjacent to shielding wall 52, a current caused in shielding wall 52 increases in amount, resulting in inefficient power transfer, and accordingly, resonant coil 11 is remote from shielding wall 52 by a prescribed distance or larger.

Distance L1 larger than distance L2 can reduce or prevent an electromagnetic wave that is radiated from resonant coil 11 entering wiring 54 passing through holes 63, 64, 65.

Power receiving device 40 according to the present embodiment has resonant coil 11 formed of a coil wire wound about a centerline O1 approximately twice.

"AM1" indicated in FIG. 7 denotes a portion of resonant coil 11 located at a center in a direction in which the coil wire extends. In transferring electric power when resonant coil 11 passes a current center point AM1 passes a largest current. Accordingly in transferring electric power a significantly strong electromagnetic field is formed in a wide range with center point AM1 serving as a center.

Holes 63, 64, 65 are located opposite to center point AM1 with centerline O1 posed therebetween. Holes 63, 64, 65 and center point AM1 have a distance L3 therebetween, which is larger than distance L1 and distance L2. This can reduce or prevent an electromagnetic wave entering wiring 54 if a strong electromagnetic field is formed around center point AM1.

Holes 63, 64, 65 and capacitor 19 have a distance L5 therebetween and capacitor 19 and shielding wall 52 have a distance L4 therebetween, and distance L5 is larger than distance L4. In transferring electric power, while capacitor 19 is surrounded by a significantly strong magnetic field, holes 63, 64, 65 that are remote from capacitor 19 can reduce or prevent disturbance introduced into wiring 54.

Note that while in the present embodiment casing 50 has been described that includes resin casing 51 surrounding shielding wall 52, resin casing 51 is not essential in configuration and may be dispensed with.

Figure 13:
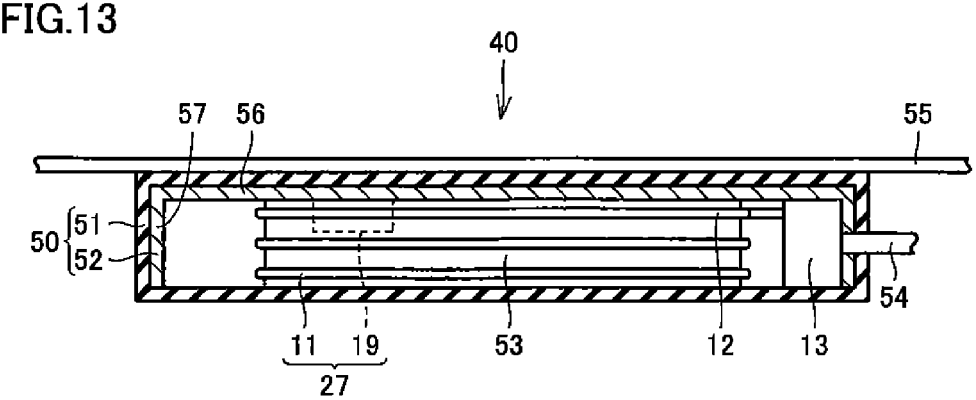
FIG. 13 is a lateral cross section of the power receiving device in a first exemplary variation.
Figure 14:
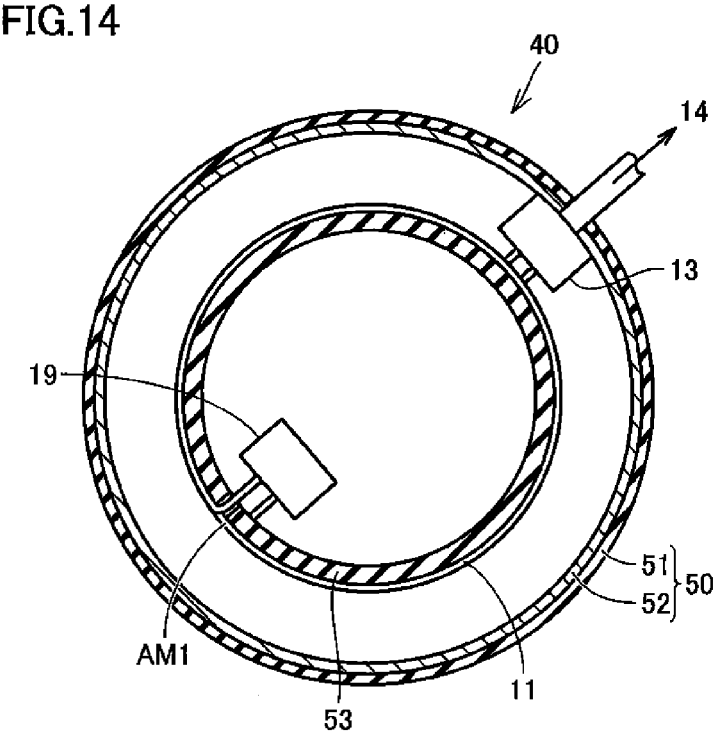
FIG. 14 is a cross section of the power receiving device.
Figure 15:
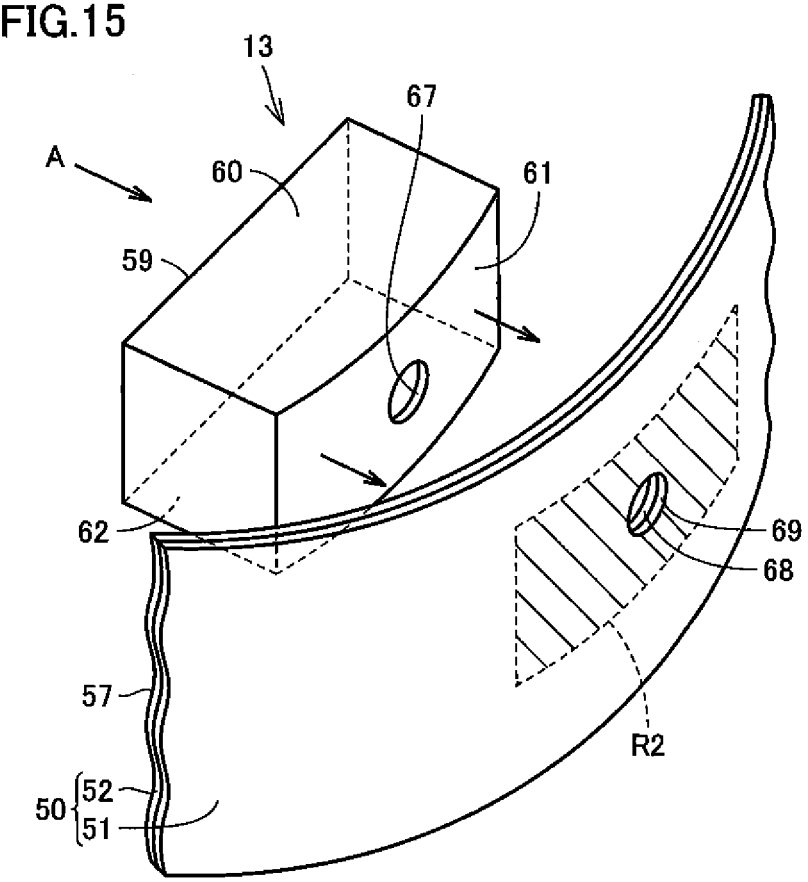
FIG. 15 is a perspective view of the rectifier detached from a shielding wall.

FIG. 13 to FIG. 15 will now be used to describe power receiving device 40 according to the present embodiment in a first exemplary variation. Of the configurations shown in FIGS. 13-15, those identical or corresponding to those shown in FIGS. 1-12 are identically denoted and may not be described repeatedly.

FIG. 13 is a lateral cross section of power receiving device 40 in the first exemplary variation and FIG. 14 is a cross section of power receiving device 40.

As shown in FIG. 13 and FIG. 14, rectifier 13 is disposed outside coil supporting member 53, and rectifier 13 is disposed on shielding wall 52 at surrounding side wall 57 along an internal circumferential surface. Wiring 54 is pulled out of rectifier 13 through a hole that is formed through surrounding side wall 57, and thus out of casing 50.

FIG. 15 is a perspective view of rectifier 13 detached from shielding wall 52. As shown in FIG. 15, shielding casing 59 has surrounding side wall 61 disposed on surrounding side wall 57, and surrounding side wall 61 has a hole 67 to allow wiring 54 to be pulled out therethrough.

Surrounding side wall 57 includes a region R2 allowing surrounding side wall 61 to be disposed thereon. Of surrounding side wall 57, a portion having region R2 has a hole 68. Hole 67 and hole 68 are positioned in communication with each other, and resin casing 51 has a hole 69 in communication with hole 68. Wiring 54 passes through holes 67, 68, 69 and is pulled out of casing 50.

Note that the example shown in FIGS. 13-15 also has wiring 54 located in region R2 when region R2 and wiring 54 are observed inside casing 50 along arrow A shown in FIG. 15 (or in a direction in which surrounding side wall 61 and region R2 are aligned). The FIGS. 13-15 example can thus also reduce or prevent an electromagnetic wave entering wiring 54.

Note that while casing 50 has been described as having a device that is rectifier 13 accommodated therein by way of example, casing 50 may have converter 14, a relay and the like accommodated therein in addition to rectifier 13. Furthermore, casing 50 may have a sensor or the like accommodated therein to sense an amount of a current, a voltage and the like of resonant coil 11. These devices also have wiring connected thereto and pulled out of casing 50, and the present invention is applicable thereto.

Figure 16:
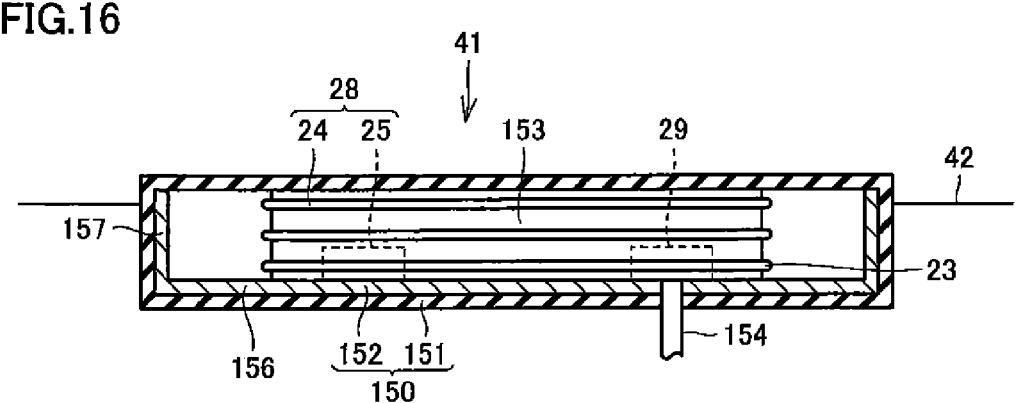
FIG. 16 is a lateral cross section of the power transmitting device according to the present embodiment.
Figure 17:
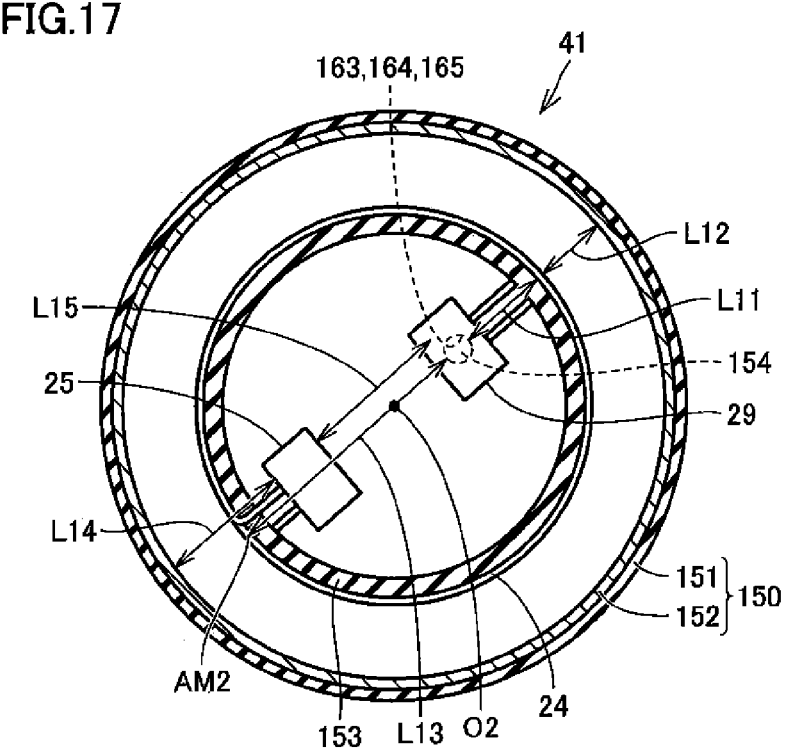
FIG. 17 is a cross section of the power transmitting device.

FIG. 16 to FIG. 21 and the like will now be used to describe power transmitting device 41 according to the present embodiment. FIG. 16 is a lateral cross section of power transmitting device 41 according to the present embodiment and FIG. 17 is a cross section of power transmitting device 41.

As shown in FIG. 16 and FIG. 17, power transmitting device 41 includes power transmitting unit 28, electromagnetic induction coil 23, a coil supporting member 153, and a casing 150. Casing 150 accommodates power transmitting unit 28, coil supporting member 153, and electromagnetic induction coil 23 therein. Casing 150 includes a hollow, cylindrical resin casing 151, and a shielding wall 152 provided on an internal, circumferential surface of resin casing 151. Casing 150 is partially buried in the ground of parking space 42.

Shielding wall 152 includes a bottom 156, and a surrounding side wall 157 extending upward from a circumference of bottom 156. Shielding wall 152 is opened upward.

Shield walling 152 is formed of metallic material such as copper and restricts a region in which an electromagnetic field formed around resonant coil 24 in transferring electric power is radiated.

As shielding wall 152 has an upper side with an opening, an electromagnetic wave formed around resonant coil 24 is mainly radiated upward through that opening.

Coil supporting member 153 is formed cylindrically and coil supporting member 153 is formed of resin material. The power transmitting unit 28 resonant coil 24 and electromagnetic induction coil 23 are attached on an outer circumferential surface of coil supporting member 153. Note that coil supporting member 153 may be formed of a plurality of columnar supports disposed annularly.

Capacitor 25 is disposed inside coil supporting member 153, and capacitor 25 is connected to resonant coil 24 at opposite ends.

Impedance adjuster 29 is disposed inside coil supporting member 153, and impedance adjuster 29 is connected to electromagnetic induction coil 23 at opposite ends.

Impedance adjuster 29 has a wiring 154 connected thereto, and wiring 154 is connected to high-frequency power driver 22.

Impedance adjuster 29 is disposed on shielding wall 152 at bottom 156, and wiring 154 is pulled out through a hole formed through bottom 156 and wiring 154 is thus introduced into the vehicle.

Figure 18:
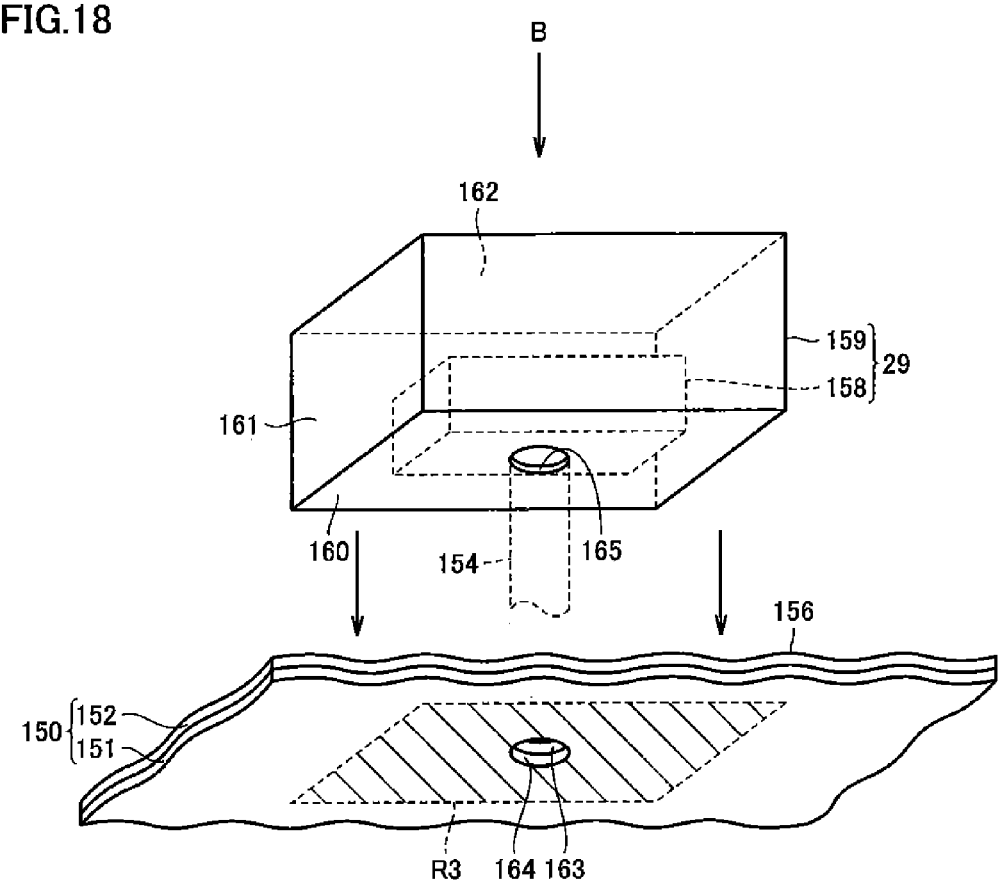
FIG. 18 is an exploded perspective view of an impedance adjuster and a region allowing the impedance adjuster to be disposed on, a bottom.

FIG. 18 is an exploded perspective view of a region R3 allowing impedance adjuster 29 to be disposed on bottom 156. Note that in FIG. 18 wiring 154 is indicated by a broken line.

Impedance adjuster 29 includes an impedance adjuster body 158, and a shielding casing 159 to accommodate impedance adjuster body 158 therein. Shielding casing 159 includes a bottom 160, a surrounding side wall 161 rising upward from an outer peripheral edge of bottom 160, and a top 162 provided at an upper end of surrounding side wall 161. Bottom 160 is close to shielding wall 152 than resonant coil 24.

Bottom 160 has a hole 163 allowing wiring 154 connected to impedance adjuster body 158 to be pulled out of shielding casing 159. Shielding casing 159 is formed of metallic material such as copper and reduces or prevents an electromagnetic wave entering shielding casing 159.

Shielding casing 159 has impedance adjuster body 158 accommodated therein to prevent impedance adjuster body 158 from having its elements erroneously operated by an external electromagnetic wave. Shielding wall 152 has bottom 156 including region R3 to allow shielding casing 159 to be disposed thereon at bottom 160. Note that, in the first embodiment, shielding casing 159 is disposed to have bottom 160 in contact with bottom 156 at a portion having region R3.

Of bottom 156, a portion at which region R3 is located is provided with a hole 163 receiving and allowing wiring 154 to pass therethrough, and resin casing 151 also has a top provided with a hole 164 in communication with hole 163. Wiring 154 pulled out of shielding casing 159 passes through hole 163 and hole 165 and is pulled out of casing 150.

Figure 19:
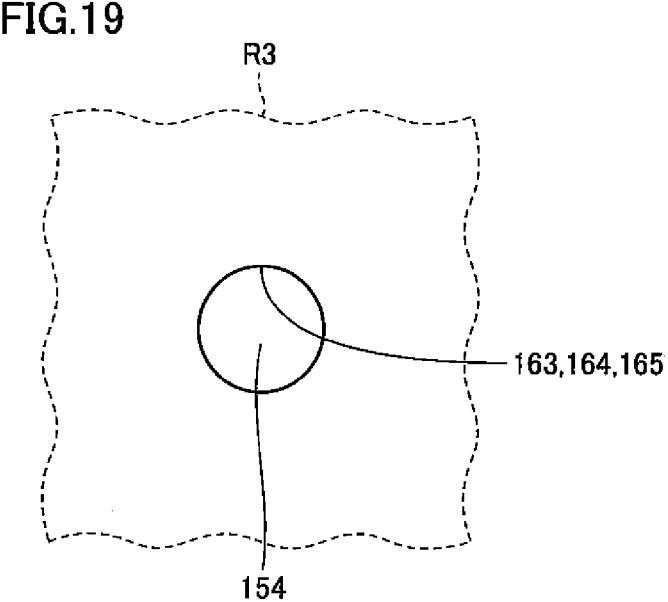
FIG. 19 is a plan view obtained when a wiring and the region are observed inside a casing in a direction indicated in FIG. 18 by an arrow.

FIG. 19 is a plan view obtained when wiring 154 and region R3 are observed inside casing 150 in a direction indicated in FIG. 18 by an arrow B. Arrow B indicates a direction in which shielding casing 159 (bottom 160) and region R3 are aligned. As shown in FIG. 19, wiring 154 is located in region R3. Region R3 is a region allowing shielding wall 152 and shielding casing 159 to have their respective bottoms 156 and 160 in contact with each other, and an electromagnetic wave radiated from resonant coil 24 is not allowed to easily enter between region R3 and bottom 160.

Thus, wiring 154 is less easily disturbed. Note that a portion of wiring 154 located in shielding casing 159 is protected by shielding casing 159 and a portion of wiring 154 located outside casing 150 is protected by shielding wall 152.

Furthermore, holes 163, 164, 165 are aligned in the direction of arrow B and positioned in communication with each other. This allows wiring 154 to be pulled out of casing 150 without passing through a space located outside shielding casing 159 and inside casing 150, and thus reduces or prevents an electromagnetic wave that is radiated from resonant coil 24 entering wiring 154.

Furthermore, holes 163, 164, 165 aligned in a single direction in communication with each other prevent wiring 154 from bending. In FIG. 17, holes 163, 164, 165 and resonant coil 24 have a distance L11 therebetween and resonant coil 24 and shielding wall 152 have a distance L12 therebetween, and distance L11 is larger than distance L12.

If resonant coil 24 is adjacent to shielding wall 152, a current caused in shielding wall 152 increases in amount, resulting in inefficient power transfer, and accordingly, resonant coil 24 is remote from shielding wall 152 by a prescribed distance or larger.

Distance L11 larger than distance L12 can reduce or prevent an electromagnetic wave that is radiated from resonant coil 24 entering wiring 154 passing through holes 163, 164, 165.

Power transmitting device 41 according to the present embodiment has resonant coil 24 formed of a coil wire wound about a centerline O2 approximately twice.

"AM2" indicated in FIG. 17 denotes a portion of resonant coil 24 located at a center in a direction in which the coil wire extends. In transferring electric power when resonant coil 24 passes a current center point AM2 passes a largest current. Accordingly in transferring electric power a significantly strong electromagnetic field is formed in a wide range with center point AM2 serving as a center.

Holes 163, 164, 165 are located opposite to center point AM2 with centerline O2 posed therebetween. Holes 163, 164, 165 and center point AM2 have a distance L13 therebetween, which is larger than distance L11 and distance L12. This can reduce or prevent an electromagnetic wave entering wiring 154 if a strong electromagnetic field is formed around center point AM2.

Holes 163, 164, 165 and capacitor 25 have a distance L15 therebetween and capacitor 25 and shielding wall 152 have a distance L14 therebetween, and distance L15 is larger than distance L14. In transferring electric power, while capacitor 25 is surrounded by a significantly strong magnetic field, holes 163, 164, 165 that are remote from capacitor 25 can reduce or prevent disturbance introduced into wiring 154.

Note that while in the present embodiment casing 150 has been described that includes resin casing 151 surrounding shielding wall 152, resin casing 151 is not essential in configuration and may be dispensed with.

Figure 20:
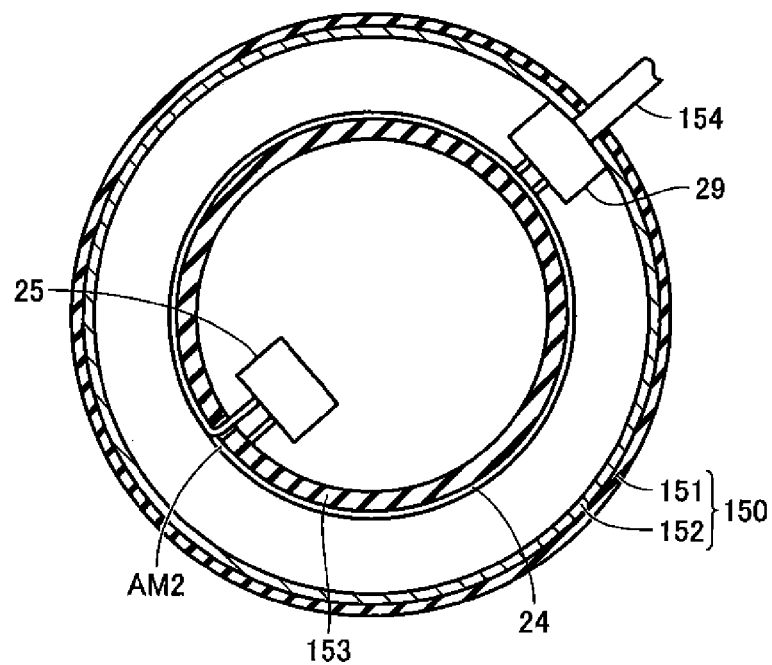
FIG. 20 is a lateral cross section of a power transmitting device 41 in a first exemplary variation.
Figure 21:
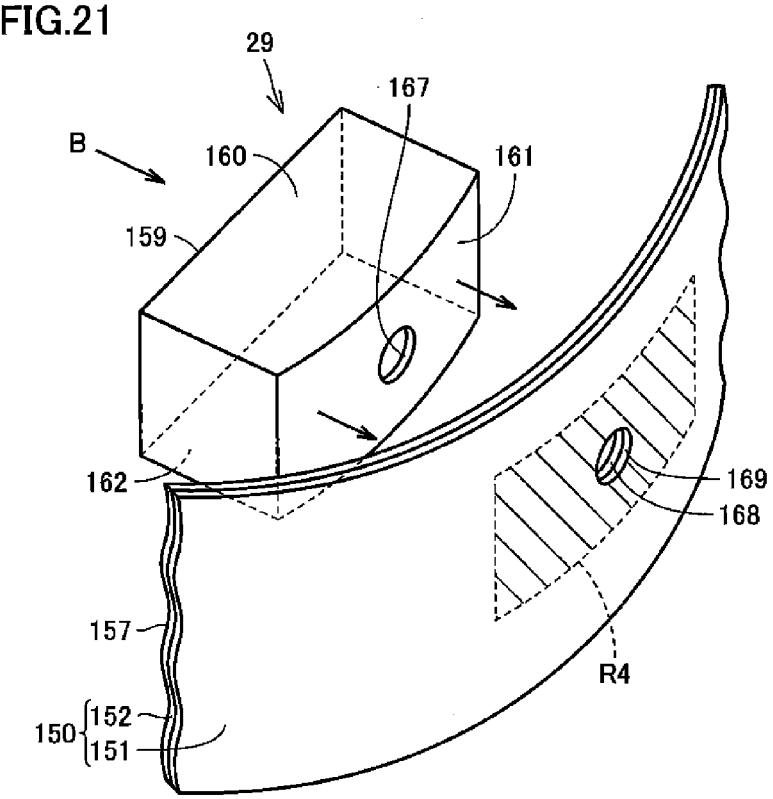
FIG. 21 is an exploded perspective view of power transmitting device 41.

FIG. 20 and FIG. 21 will now be used to describe power transmitting device 41 according to the present embodiment in a first exemplary variation. FIG. 20 is a lateral cross section of power transmitting device 41 in the first exemplary variation and FIG. 21 is an exploded perspective view of power transmitting device 41.

As shown in FIG. 20 and FIG. 21, impedance adjuster 29 is disposed outside coil supporting member 153, and impedance adjuster 29 is disposed on shielding wall 152 at surrounding side wall 157 along an internal circumferential surface. Wiring 154 is pulled out of impedance adjuster 29 through a hole that is formed through surrounding side wall 157, and thus out of casing 150.

Note that the example shown in FIGS. 20 and 21 also has wiring 154 located in region R4 when region R4 and wiring 154 are observed inside casing 150 along arrow B shown in FIG. 21 (or in a direction in which region R4 and surrounding side wall 161 are aligned). The FIGS. 20-21 example can thus also reduce or prevent an electromagnetic wave entering wiring 154. Note that while casing 150 has been described as having a device that is impedance adjuster 29 accommodated therein by way of example, the present invention is applicable not only to impedance adjuster 29 but also a sensor sensing a current of resonant coil 24 in amount and the like.

Second Embodiment

FIG. 22 to FIG. 27 will now be used to describe a power transfer system according to a second embodiment. Of the configurations shown in FIGS. 22-27, those identical or corresponding to those shown in FIGS. 1-21 are identically denoted and may not be described repeatedly.

Figure 22:
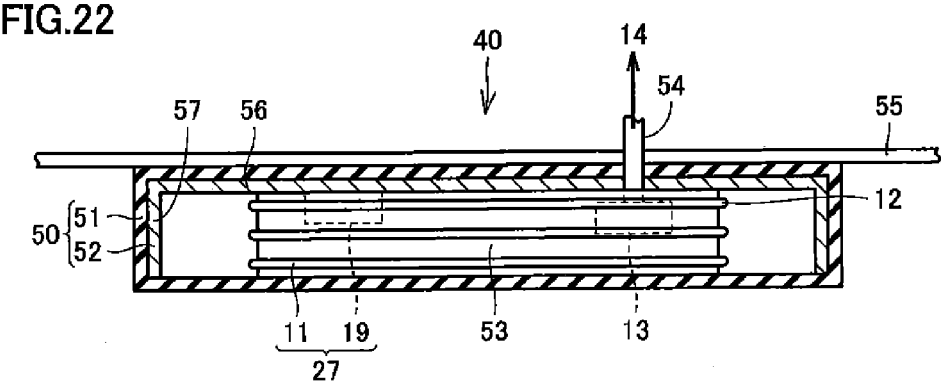
FIG. 22 is a cross section of a power receiving device of a power transfer system according to a second embodiment.

FIG. 22 is a cross section of power receiving device 40 of the power transfer system according to the second embodiment. In the example shown in FIG. 22, rectifier 13 is disposed below top 56, and rectifier 13 is spaced from top 56.

Figure 23:
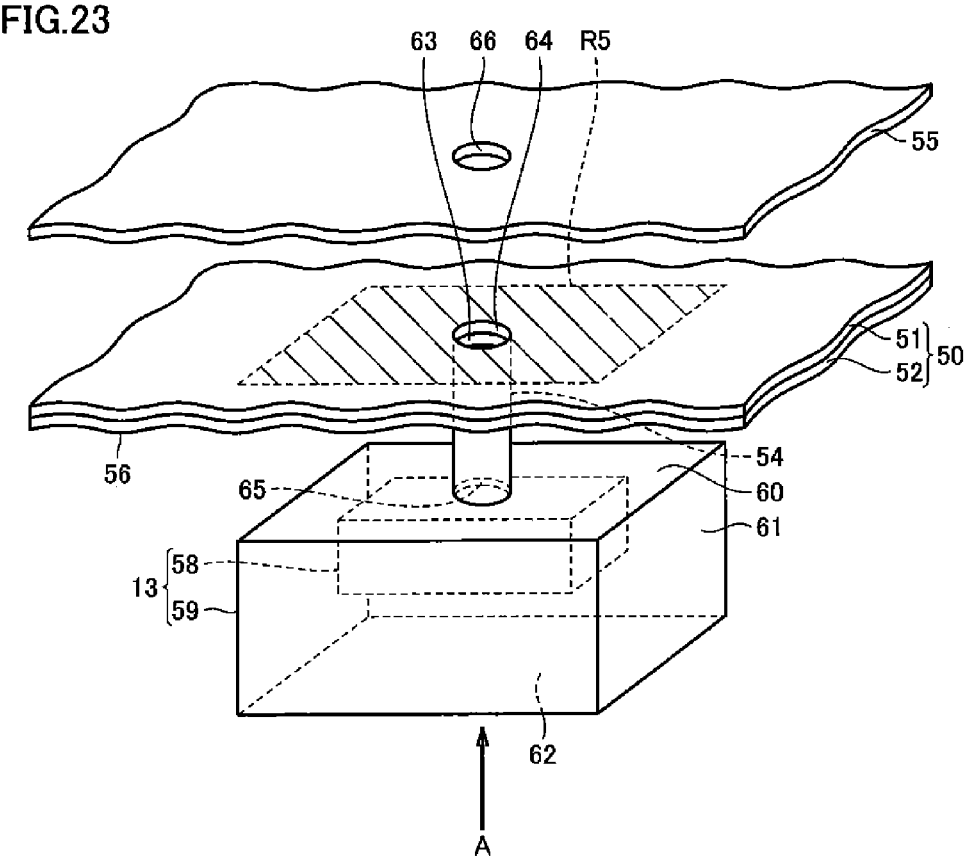
FIG. 23 is a partially exploded perspective view of the rectifier shown in FIG. 22 and a member around the rectifier.

FIG. 23 is a partially exploded perspective view of rectifier 13 shown in FIG. 22 and a member around the rectifier. As shown in FIG. 23, shielding casing 59 is spaced from an internal surface of shielding wall 52. Note that shielding casing 59 is secured to shielding wall 52 at top 56 by a securing member (not shown).

Shielding casing 59 has top 60 closer to the internal surface of shielding wall 52 than resonant coil 11. Shielding wall 52 and shielding casing 59 have an internal surface and an external surface, respectively, spaced by a distance, which is smallest between the shielding wall 52 top 56 and the shielding casing 59 top 60.

Of top 56 of shielding wall 52, a portion facing top 60 of shielding casing 59 will be referred to as an adjacent region R5.

Top 60 has hole 65 and adjacent region R5 also has hole 63. Note that resin casing 51 also has hole 64 in communication with hole 63 and floor panel 55 also has hole 66 in communication with hole 64.

Wiring 54 is pulled through hole 65 and thus out of shielding casing 59, and then through hole 63 and thus outside shielding wall 52. Wiring 54 then passes through holes 64 and 66 and is thus introduced into electrical powered vehicle 10.

Wiring 54 thus pulled only has a limited portion located between shielding casing 59 and shielding wall 52.

Wiring 54 thus having only a limited portion located outside shielding casing 59 and inside shielding wall 52 can be less affected by an electromagnetic field formed around resonant coil 11.

In particular, hole 63 and hole 65 are located at a side opposite to resonant coil 11 with shielding casing 59 therebetween. This allows shielding casing 59 to reduce or prevent an electromagnetic field that is formed around resonant coil 11 reaching wiring 54 exposed from shielding casing 59, and can thus prevent wiring 54 from providing a disturbed output.

Figure 24:
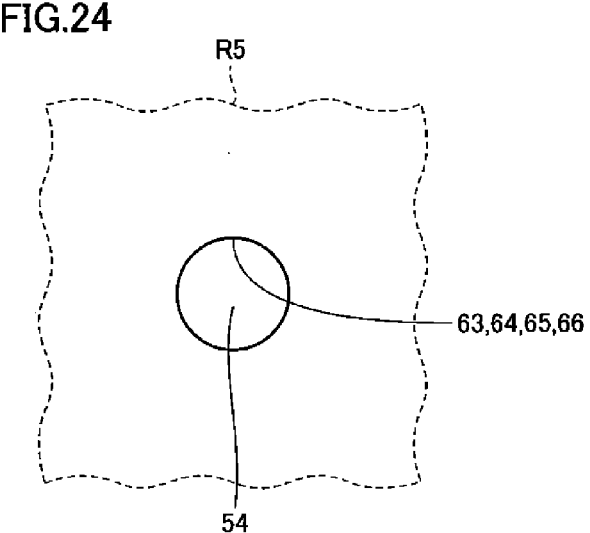

FIG. 24 is a plan view schematically showing wiring 54, holes 63-66, adjacent region R5, and the like. More specifically, FIG. 24 is a plan view obtained when wiring 54, holes 63-66, and adjacent region R5 are observed in a direction indicated by arrow A shown in FIG. 23. Arrow A indicates a direction in which the shielding casing 59 top 60 and the shielding wall 52 adjacent region R5 are aligned.

As shown in FIG. 24, it can be seen that when wiring 54 and adjacent region R5 are observed in the direction of arrow A, a portion of wiring 54 located between top 60 and hole 63 is located in adjacent region R5.

This can prevent an electromagnetic field formed around resonant coil 11 from introducing disturbance into an output of wiring 54.

Figure 25:
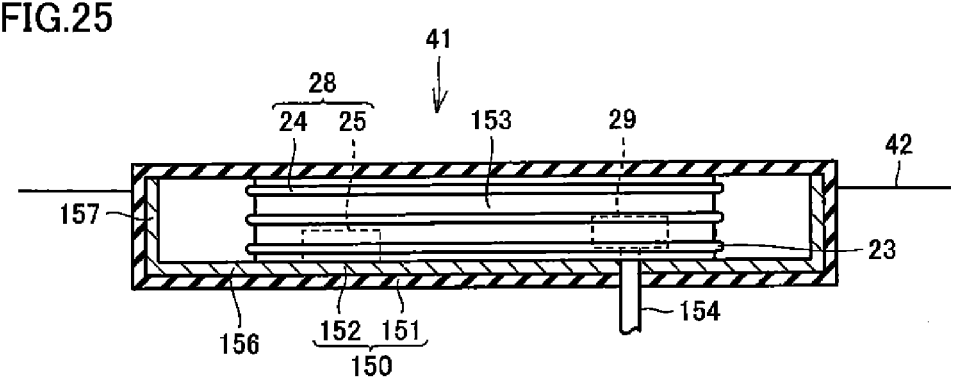
FIG. 25 is a cross section of a power transmitting device according to the second embodiment.
Figure 26:
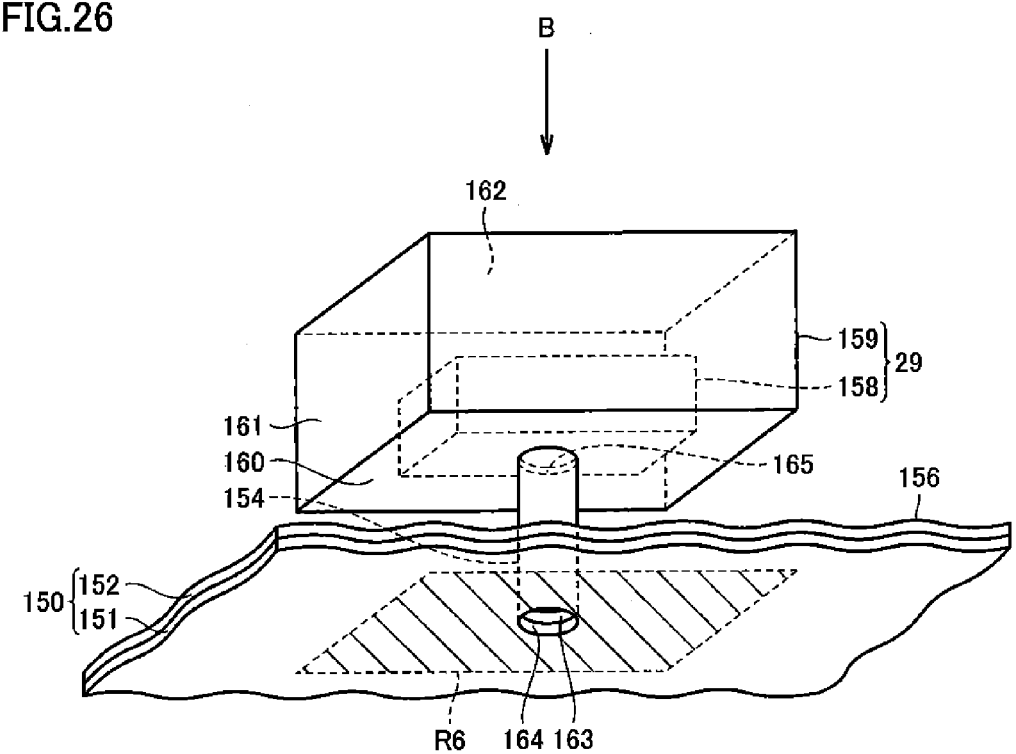

FIG. 25 is a cross section of power transmitting device 41 according to the second embodiment and FIG. 26 is a perspective view of impedance adjuster 29, wiring 154, resin casing 151, and the like. As shown in FIG. 26, impedance adjuster 29 is spaced from shielding wall 152 and thus secured. Note that impedance adjuster 29 is secured to shielding wall 152 by a securing member (not shown).

Shielding casing 159 has bottom 160 closer to an internal surface of shielding wall 152 than resonant coil 24. Shielding wall 152 and shielding casing 159 at an external surface thereof have a distance therebetween, which is smallest between the shielding wall 152 bottom 156 and the shielding casing 159 bottom 160. Of bottom 156 of shielding wall 152, a portion facing bottom 160 of shielding casing 159 will be referred to as an adjacent region R6.

Bottom 160 has hole 165 and adjacent region R6 also has hole 163. Resin casing 151 also has hole 164 in communication with hole 163.

Wiring 154 is pulled through hole 165 and thus out of shielding casing 159, and then through holes 163 and 164 externally.

Wiring 154 thus pulled only has a limited portion located between shielding casing 159 and shielding wall 152. Wiring 154 thus having only a limited portion located outside shielding casing 159 and inside shielding wall 152 can be less affected by an electromagnetic field formed around resonant coil 24.

In particular, hole 163 and hole 165 are located at a side opposite to resonant coil 24 with shielding casing 159 therebetween. This allows shielding casing 159 to reduce or prevent an electromagnetic field that is formed around resonant coil 24 reaching wiring 154 exposed from shielding casing 159, and can thus prevent wiring 154 from providing a disturbed output.

Figure 27:
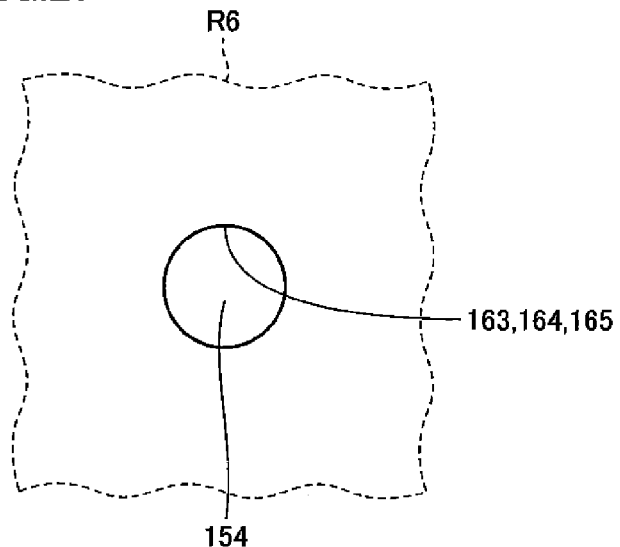
FIG. 27 is a plan view obtained when the wiring, the hole, and the adjacent region are observed inside a shielding wall in a direction indicated in FIG. 26 by an arrow.

FIG. 27 is a plan view schematically showing wiring 154, holes 163-165, adjacent region R6, and the like. More specifically, FIG. 27 is a plan view obtained when wiring 154, holes 163-165, and adjacent region R6 are observed inside shielding wall 152 in a direction indicated by arrow B shown in FIG. 26. Arrow B indicates a direction in which the shielding casing 159 bottom 160 and the shielding wall 152 adjacent region R6 are aligned.

As shown in FIG. 27, it can be seen that when wiring 154 and adjacent region R6 are observed in the direction of arrow B, a portion of wiring 154 located between bottom 160 and adjacent region R6 is located in adjacent region R6.

This can prevent an electromagnetic field formed around resonant coil 24 from introducing disturbance into an output of wiring 154.

Third Embodiment

Figure 28:
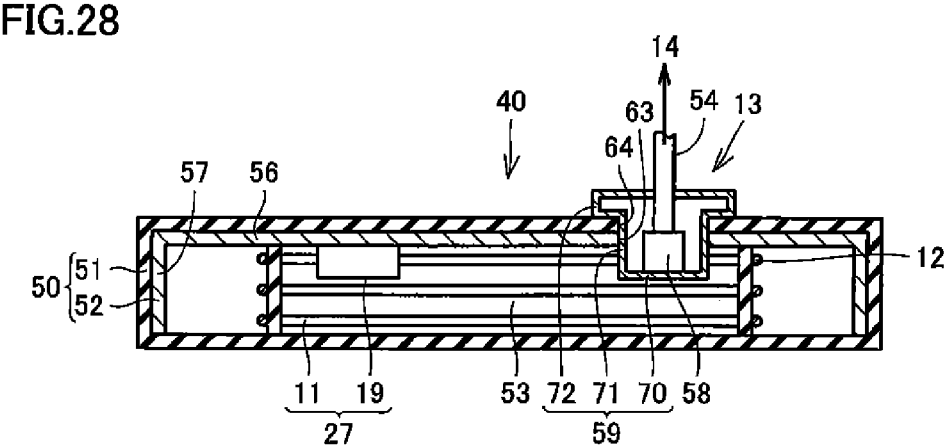
FIG. 28 is a cross section of a power receiving device according to a third embodiment.
Figure 29:
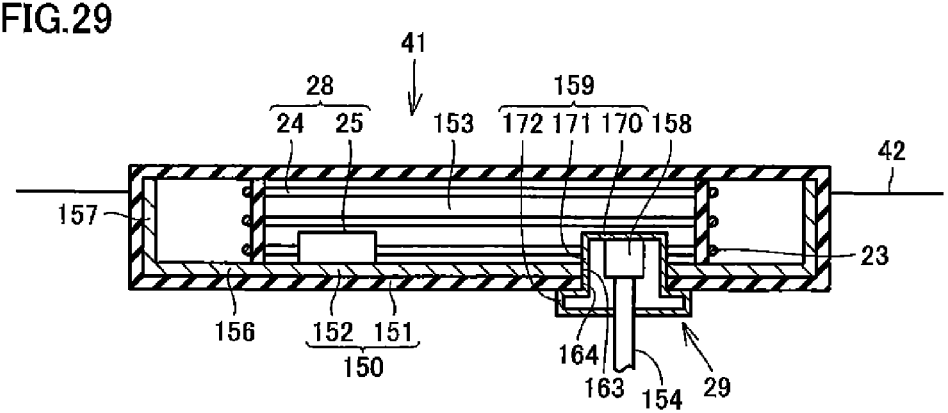
FIG. 29 is a cross section of a power transmitting device.

FIG. 28 and FIG. 29 will now be used to describe a power transfer system according to a third embodiment. Of the configurations shown in FIGS. 28 and 29, those identical or corresponding to those shown in FIGS. 1-27 are identically denoted and may not be described repeatedly.

FIG. 28 is a cross section of power receiving device 40 according to the present embodiment. As shown in FIG. 28, shielding wall 52 has top 56 with hole 63, and resin casing 51 also has hole 64 in communication with hole 63.

Rectifier 13 includes shielding casing 59 and rectifier body 58 accommodated in shielding casing 59. Shielding casing 59 includes a body 70 having rectifier body 58 accommodated therein, a projection 71 that projects from body 70 and enters hole 63 and hole 64, and a flange 72 formed at an end portion of projection 71.

Rectifier body 58 has wiring 54 connected thereto. Projection 71 and flange 72 are hollow, and flange 72 is formed to project on a top of resin casing 51 from the opening of hole 64 therearound. Wiring 54 passes through projection 71 and flange 72 and is pulled out externally from a top of flange 72.

Of wiring 54, a portion located outside shielding casing 59 is located outside shielding wall 52. A current that passes through wiring 54 can be less affected by an electromagnetic field formed around resonant coil 11.

FIG. 29 is a cross section of power transmitting device 41. As shown in FIG. 29, shielding wall 152 has bottom 156 with hole 163, and resin casing 151 also has hole 164.

Impedance adjuster 29 includes shielding casing 159 and impedance adjuster body 158 accommodated in shielding casing 159. Shielding casing 159 includes a body 170, a projection 171 that projects from body 170 and enters hole 163 and hole 164, and a flange 172 formed at an end portion of projection 171.

Impedance adjuster body 158 has wiring 154 connected thereto. Projection 171 and flange 172 are hollow. Flange 172 is formed to project on a bottom of resin casing 151 from an edge of the opening of hole 164 therearound. Wiring 154 passes through projection 171 and flange 172 and is thus pulled out from a bottom of flange 172 and thus out of shielding casing 159.

Wiring 154 is thus also never located inside shielding wall 152, and a current that passes through wiring 154 can be less affected by an electromagnetic field formed around resonant coil 24. This can reduce or prevent disturbance introduced into a current passing through wiring 154.

It should be understood that the embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The present invention is applicable to a power receiving device, a power transmitting device, and a power transfer system.

REFERENCE SIGNS LIST

10: electrical powered vehicle; 11, 24: resonant coil; 12, 23: electromagnetic induction coil; 13: rectifier; 14: converter; 15: battery; 16: power control unit; 17: motor unit; 19, 25: capacitor; 20: external power feeding apparatus; 21: alternating-current power supply; 22: high-frequency power driver; 24, 11: coil; 26: control unit; 27: power receiving unit; 28: power transmitting unit; 29: impedance adjuster; 40: power receiving device; 41: power transmitting device; 42: parking space; 50, 150: casing; 51, 151: resin casing; 52, 152: shielding wall; 53, 153: coil supporting member; 54, 154: wiring; 55: floor panel; 56, 60, 162: top; 57, 61, 157, 161: surrounding side wall; 59, 159: shielding casing; 62, 156, 160: bottom; 63-669, 163-165: hole; 70, 170: body; 71, 171: projection; 72, 172: flange; A, B: direction indicating-arrow; AM1: center point; C: capacitance; ECU: vehicle; L: inductance; L1, L2, L3, L4, L5, L11, L12, L13, L14, L15: distance; O1, O2: centerline; R1, R2, R3, R4: region; R5, R6: adjacent region; k1, k2, k3: curve.

The invention claimed is:

1. A power receiving device comprising:
 a power receiving unit receiving electric power from an external power transmitting unit contactlessly;
 a first coil provided in said power receiving unit;
 a first shielding wall surrounding said first coil and defining a region in which an electromagnetic field formed around said first coil is radiated;
 a first device accommodated inside said first shielding wall;
 a first shielding casing having said first device accommodated therein, said first shielding casing being also disposed inside said first shielding wall; and
 a first wiring connected to said first device and extending from inside said first shielding casing to outside said first shielding casing, and also pulled outside said first shielding wall,
 said first shielding casing having an external surface including a first opposite portion closer to said first shielding wall than said first coil,
 said first shielding wall having a first region opposite to said first opposite portion, said first region having a first hole,
 said first wiring being pulled outside said first shielding wall through said first hole.

2. The power receiving device according to claim 1, wherein said first shielding casing is disposed to have said first opposite portion in contact with said first shielding wall at a portion having said first region, and said first wiring is pulled out of said first shielding casing at a portion having said first shielding casing and said first shielding wall in contact with each other.

3. The power receiving device according to claim 2, wherein when said first region and said first wiring are observed inside said first shielding wall in a direction in which said first shielding casing and said first region are aligned, a portion of said first wiring located between said first shielding casing and said first hole is located in said first region.

4. The power receiving device according to claim 1, wherein:
said first shielding casing includes a first projection introduced into said first hole; and
said first wiring passes through said first projection and is pulled outside said first shielding wall.

5. The power receiving device according to claim 1, wherein said first hole and said first coil have a distance therebetween larger than that between said first shielding wall and said first coil.

6. The power receiving device according to claim 1, wherein:
said power receiving unit includes a first capacitor connected to said first coil; and
said first hole and said first capacitor have a distance therebetween larger than that between said first capacitor and said first shielding wall.

7. The power receiving device according to claim 1, further comprising a first electromagnetic induction coil receiving electric power from said first coil through electromagnetic induction, wherein:
said first device is a rectifier body connected to said first electromagnetic induction coil; and
said first wiring passes a current rectified by said rectifier body.

8. The power receiving device according to claim 1, wherein:
said first shielding wall includes a top disposed under a floor panel of a vehicle, and a surrounding side wall hanging downward from said top; and
said first hole is formed through said top.

9. The power receiving device according to claim 1, wherein said power transmitting unit and said power receiving unit have natural frequencies, respectively, with a difference equal to or smaller than 10% of the natural frequency of said power receiving unit.

10. The power receiving device according to claim 1, wherein said power receiving unit, and said power transmitting unit have a coupling coefficient equal to or smaller than 0.1.

11. The power receiving device according to claim 1, wherein said power receiving unit receives electric power from said power transmitting unit through at least one of a magnetic field formed between said power receiving unit and said power transmitting unit and oscillating at a particular frequency and an electric field formed between said power receiving unit and said power transmitting unit and oscillating at a particular frequency.

12. A power transmitting device comprising:
a power transmitting unit transmitting electric power to an external power receiving unit contactlessly;
a second coil provided in said power transmitting unit;
a second shielding wall surrounding said second coil and defining a region in which an electromagnetic field formed around said second coil is radiated;
a second device accommodated inside said second shielding wall;
a second shielding casing having said second device accommodated therein, said second shielding casing being also disposed inside said second shielding wall; and
a second wiring connected to said second device and extending from inside said second shielding casing to outside said second shielding casing, and also pulled outside said second shielding wall,
said second shielding casing having an external surface including a second opposite portion closer to said second shielding wall than said second coil,
said second shielding wall having a second region opposite to said second opposite portion, said second region having a second hole,
said second wiring being pulled outside said second shielding wall through said second hole.

13. The power transmitting device according to claim 12, wherein said second shielding casing is disposed to have said second opposite portion in contact with said second shielding wall at a portion having said second region, and said second wiring is pulled out of said second shielding casing at a portion of said second shielding casing in contact with said second region.

14. The power transmitting device according to claim 13, wherein when said second region and said second wiring are observed inside said second shielding wall in a direction in which said second shielding casing and said second region are aligned, a portion of said second wiring located between said second shielding casing and said second hole is located in said second region.

15. The power transmitting device according to claim 12, wherein:
said second shielding casing a second projection introduced into said second hole; and
said second wiring passes through said second projection and is pulled outside said second shielding wall.

16. The power transmitting device according to claim 12, wherein said second hole and said second coil have a distance therebetween larger than that between said second shielding wall and said second coil.

17. The power transmitting device according to claim 12, wherein:
said power transmitting unit includes a second capacitor connected to said second coil; and
said second hole and said second capacitor have a distance therebetween larger than that between said second capacitor and said second shielding wall.

18. The power transmitting device according to claim 12, further comprising a second electromagnetic induction coil passing electric power to said second coil through electromagnetic induction, wherein said second device is an impedance adjuster body connected to said second electromagnetic induction coil.

19. The power transmitting device according to claim 12, wherein:
said second shielding wall includes a bottom wall, and a surrounding side wall rising upward from said bottom wall; and
said second hole is formed through said bottom wall.

20. The power transmitting device according to claim 12, wherein said power transmitting unit and said power receiving unit have natural frequencies, respectively, with a difference equal to or smaller than 10% of the natural frequency of said power receiving unit.

21. The power transmitting device according to claim 12, wherein said power receiving unit and said power transmitting unit have a coupling coefficient equal to or smaller than 0.1.

22. The power transmitting device according to claim 12, wherein said power transmitting unit transmits electric power to said power receiving unit through at least one of a magnetic field formed between said power transmitting unit and said power receiving unit and oscillating at a particular frequency and an electric field formed between said power transmitting unit and said power receiving unit and oscillating at a particular frequency.

23. A power transfer system comprising a power receiving device and a power transmitting device including a power transmitting unit, said power receiving device having:
   a power receiving unit receiving electric power from said power transmitting unit contactlessly;
   a first coil provided in said power receiving unit;
   a first shielding wall surrounding said first coil and defining a region in which an electromagnetic field formed around said first coil is radiated;
   a first device accommodated inside said first shielding wall;
   a first shielding casing having said first device accommodated therein, said first shielding casing being also disposed inside said first shielding wall; and
   a first wiring connected to said first device and extending from inside said first shielding casing to outside said first shielding casing, and also pulled outside said first shielding wall,
   said first shielding casing having an external surface including a first opposite portion closer to said first shielding wall than said first coil,
   said first shielding wall having a first region opposite to said first opposite portion, said first region having a first hole,
   said first wiring being pulled outside said first shielding wall through said first hole.

24. A power transfer system comprising a power transmitting device and a power receiving device including a power receiving unit, said power transmitting device having:
   a power transmitting unit transmitting electric power to said power receiving unit contactlessly;
   a second coil provided in said power transmitting unit;
   a second shielding wall surrounding said second coil and defining a region in which an electromagnetic field formed around said second coil is radiated;
   a second device accommodated inside said second shielding wall;
   a second shielding casing having said second device accommodated therein, said second shielding casing being also disposed inside said second shielding wall; and
   a second wiring connected to said second device and extending from inside said second shielding casing to outside said second shielding casing, and also pulled outside said second shielding wall,
   said second shielding casing having an external surface including a second opposite portion closer to said second shielding wall than said second coil,
   said second shielding wall having a second region opposite to said second opposite portion, said second region having a second hole,
   said second wiring being pulled outside said second shielding wall through said second hole.

\* \* \* \* \*